(12) United States Patent
Yun et al.

(10) Patent No.: US 7,626,745 B2
(45) Date of Patent: Dec. 1, 2009

(54) DIFFRACTIVE THIN-FILM PIEZOELECTRIC MICROMIRROR AND METHOD OF PRODUCING THE SAME

(75) Inventors: Sang Kyeong Yun, Kyunggi-do (KR); Jong-Hyeong Song, Kyunggi-do (KR); Seung-Do An, Kyunggi-do (KR); Min-Suk Oh, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 287 days.

(21) Appl. No.: 10/952,556

(22) Filed: Sep. 28, 2004

(65) Prior Publication Data

US 2005/0105157 A1    May 19, 2005

(30) Foreign Application Priority Data

Nov. 3, 2003    (KR) .................... 10-2003-0077389

(51) Int. Cl.
*G02B 26/12*    (2006.01)

(52) U.S. Cl. .................... 359/224.1; 359/223.1

(58) Field of Classification Search .............. 359/223.1, 359/224.1
See application file for complete search history.

(56) References Cited

U.S. PATENT DOCUMENTS

| 5,311,360 | A | 5/1994 | Bloom et al. |
| 5,637,517 | A | 6/1997 | Choi |
| 6,060,818 | A | 5/2000 | Ruby |
| 2002/0167245 | A1 | 11/2002 | Deutsch et al. |

FOREIGN PATENT DOCUMENTS

| EP | 0831352 A1 | 3/1998 |
| FR | 2 753 565 A | 3/1998 |
| JP | 5-72490 A | 3/1993 |
| JP | 7-306367 A | 11/1995 |
| JP | 9-96768 A | 4/1997 |

(Continued)

OTHER PUBLICATIONS

Muralt, P., "Ferroelectric Thin Films for Micro-Sensors and Actuators: A Review," Journal of Micromechanics and Microengineering 10:136-146, 2000.

(Continued)

*Primary Examiner*—Joshua L Pritchett
(74) *Attorney, Agent, or Firm*—Christensen O'Connor Johnson Kindness PLLC

(57) ABSTRACT

Disclosed is a diffractive micromirror and a method of producing the same. More particularly, the present invention pertains to a diffractive thin-film piezoelectric micromirror, which is operated in a piezoelectric operation manner to assure excellent displacement, operation speed, reliability, linearity, and low voltage operation, and a method of producing the same. The diffractive thin-film piezoelectric micromirror includes a silicon substrate on which a recess is formed to provide an air space to the center thereof, and a piezoelectric mirror layer having a band shape, which is attached to the silicon substrate along both ends of the recess at both ends thereof while being spaced from the bottom of the recess at a center portion thereof and which includes a thin-film piezoelectric material layer to be vertically movable when voltage is applied to the piezoelectric material layer, and thus diffracts an incident light beam.

14 Claims, 18 Drawing Sheets

FOREIGN PATENT DOCUMENTS

| | | |
|---|---|---|
| JP | 09-289342 | 11/1997 |
| JP | 2000-180739 A | 6/2000 |
| JP | 2001-188186 A | 7/2001 |
| JP | 2002-55297 A | 2/2002 |
| JP | 2002-162573 A | 6/2002 |
| JP | 2003-021798 | 1/2003 |
| KR | 2000-7014798 | 12/2000 |
| WO | 01/13457 A1 | 2/2001 |
| WO | 03/014789 A2 | 2/2003 |

OTHER PUBLICATIONS

Wood, D., et al, "Actuators and Their Mechanisms in Microengineering," Engineering Science and Education Journal, Feb. 1998, pp. 19-27.

DIFFRACTIVE THIN-FILM PIEZOELECTRIC MICROMIRROR AND METHOD OF PRODUCING THE SAME

BACKGROUND OF THE INVENTION

1. Field of the Invention

The present invention relates, in general, to a diffractive micromirror and a method of producing the same and, more particularly, to a diffractive thin-film piezoelectric micromirror, which is operated in a piezoelectric operation manner to assure excellent displacement, operation speed, reliability, linearity, and low voltage operation, and a method of producing the same.

2. Description of the Prior Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase only filter, an optical logic gate, a light amplifier, an image processing technique, an optical device, and a light modulator using a spatial light modulation theory. The spatial light modulator is applied to optical memory, optical display device, printer, optical interconnection, and hologram fields, and studies have been conducted to develop a display device employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended above an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited. The nitride film 14 is patterned by the ribbons 18, and a portion of the silicon dioxide film 12 is etched, thereby maintaining the ribbons 18 on the oxide spacer layer 12 by a nitride frame 20. In order to modulate light having a single wavelength of $\lambda_o$, the modulator is designed so that thicknesses of the ribbon 18 and oxide spacer 12 are each $\lambda/4$.

Limited by a vertical distance (d) between a reflective surface 22 of each ribbon 18 and a reflective surface of the substrate 16, a grating amplitude of the modulator 10 is controlled by applying a voltage between the ribbon 18 (the reflective surface 22 of the ribbon 18 acting as a first electrode) and the substrate 16 (a conductive layer 24 formed on a lower side of the substrate 16 to act as a second electrode). In an undeformed state of the light modulator with no voltage application, the grating amplitude is $\lambda/2$ while a total round-trip path difference between light beams reflected from the ribbon and substrate is $\lambda_o$. Thus, a phase of reflected light is reinforced. Accordingly, in the undeformed state, the modulator 10 acts as a plane mirror when it reflects incident light. In FIG. 2, reference numeral 20 denotes the incident light reflected by the modulator 10 in the undeformed state.

When a proper voltage is applied between the ribbon 18 and substrate 16, the electrostatic force enables the ribbon 18 to move downward toward the surface of the substrate 16. At this time, the grating amplitude is changed to $\lambda/4$. The total round-trip path difference is a half of a wavelength, and light reflected from the deformed ribbon 18 and light reflected from the substrate 16 are subjected to destructive interference. The modulator diffracts incident light 26 using the interference. In FIG. 3, reference numerals 28 and 30 denote light beams diffracted in +/− diffractive modes ($D_{+1}$, $D_{-1}$) in the deformed state, respectively.

It has been proven that sticking of the ribbon 18 to the substrate 16 is a common problem of the light modulator 10 during a wet process applied to form a space under the ribbon 18 and during operation of the modulator 10. There are various methods of reducing the sticking: lyophilization, a dry etching of a photoresist-acetone sacrificial layer, an OTS single layer treatment, use of a hard ribbon and/or a tightened nitride film gained by shortening the ribbon, a method of roughing or wrinkling one or both surfaces of two facing surfaces, a method of forming a reverse rail on the lower part of the ribbon, and a method of changing the chemical properties of the surfaces. In a solid-state sensor and actuator workshop held in June, 1994 at the Hilton Head Island in Scotland, prevention of sticking was reported, which is accomplished by reducing the contact area by forming a reverse rail on the lower part of a bridge and by employing a rough polysilicon layer as disclosed in "a process of finely treating the surface of a deformable grating light valve for high resolution display devices" suggested by Sandeyas, et al., and "a grating light valve for high resolution display devices", suggested by Apte et al.

Moreover, Apte et al. found that mechanical operation of the modulator 10 has a characteristic such that deformation of the ribbon 18 as a function of voltage forms hysteresis. The hysteresis is theoretically based on the fact that an electrostatic attractive force between the ribbon 18 and substrate 16 is a nonlinear function of the deformation, whereas hardness of the ribbon 18 is a substantially linear function of a resilient force by tension. FIG. 4 is a graph illustrating light output (which indirectly indicates the deformation of the ribbon 18) as a function of a voltage between the ribbon 18 and substrate 16, which shows an induced hysteretic characteristic. Accordingly, when the ribbon 18 is deformed into a down position to come into contact with the substrate 16, they are latched and require a holding voltage smaller than the original applied voltage.

U.S. Pat. No. 5,311,360 by Bloom et al. discloses a latching feature which gives a modulator 10 advantages of an active matrix design without the need for active components. Additionally, Bloom et al. describes that this feature is valuable in low power applications where efficient use of available power is very important. However, Bloom et al. discloses the addition of small ridges below ribbons 18 to reduce a contact area, thereby reducing the sticking problem. However, since the substrate of the modulator 10 is used as an optical surface, a process of adding the small ridges to the surface is complicated in that a reflective element of the substrate 16 must be smooth so as to have high reflectance and must be positioned on a planar surface of the ribbon 18.

Typical display devices are formed in 2-D arrays of pixels. Discontinuous images formed by a plurality of pixels are integrated by user's eyes, thereby forming an aggregate image of pixels constituting a whole image. Unfortunately, prices of such a display device are high because the pixels are overlapped to form a complete array, so the production cost of each pixel is duplicated. The display device comprising pixels is exemplified by televisions or computer systems. Their pixels may be formed by an LCD device or a CRT device.

Accordingly, there is required a diffractive grating light valve capable of reducing or removing the sticking between the reflective element and the substrate without a complicated surface treatment adopted to reduce the sticking.

As well, a display device is required, which reduces the number of pixels to reduce production costs without reducing image quality while designing a system.

To satisfy the above requirements, a conventional improved technology is proposed in Korean Pat. Application No. 10-2000-7014798, entitled "method and device for modulating incident light beam to form 2-D image", by Silicon Light Machines Inc.

In the "method and device for modulating the incident light beam to form the 2-D image", the diffractive grating light valve includes a plurality of elongate elements each having a reflective surface. The elongate elements are arranged on an upper side of a substrate so that they are parallel to each other, have support ends, and their reflective surfaces lie in array (GLV array). The elongate elements form groups according to display elements. The groups alternately apply a voltage to the substrate, resulting in deformation of the elements. The almost planar center portion of each deformed elongate element is parallel to and spaced from the center portion of the undeformed element by a predetermined distance which is set to ⅓-¼ of the distance between the undeformed reflective surface and the substrate. Thus, the deformed elongate elements are prevented from coming into contact with the surface of the substrate. Sticking between the elongate elements and the substrate is prevented by preventing contact between the elements and substrate. Additionally, the predetermined distance between each deformed elongate element and the substrate is limited so as to prevent hysteresis causing deformation of the elongate elements.

FIG. 5 is a side sectional view of an elongate element 100 of a GLV in an undeformed state according to a conventional improved technology. In FIG. 5, the elongate element 100 is suspended above a surface of a substrate (including constitution layers) by ends thereof. In FIG. 5, reference numeral 102 denotes an air space.

FIG. 6 is a plan view of a portion of the GLV including six elongate elements 100. The elongate elements 100 have the same width and are arranged parallel to each other. The elongate elements 100 are spaced close to each other, so that the elongate elements 100 can be deformed independently from other elements. The six elongate elements 100 as shown in FIG. 6 preferably form a single display element 200. Therefore, an array of 1920 elongate elements forms a GLV array having 320 display devices arranged therein.

FIG. 7 is a front sectional view of a display element 200 having undeformed elongate elements 100. FIG. 7 is a view taken along the line A-A' of FIG. 5. The undeformed state is selected by equalizing a bias on the elongate elements 100 to a conductive layer 106. Since reflective surfaces of the elongate elements 100 are substantially co-planar, light incident on the elongate elements 100 is reflected.

FIG. 8 is a side sectional view of a deformed elongate element 100 of the GLV. FIG. 8 shows that the deformed elongate element 100 is maintained in the suspended state thereof to be spaced from the surface of the substrate adjacent therebeneath. This is in contrast to the conventional modulator of FIGS. 1 to 3. Contact between the elongate element 100 and the surface of the substrate is prevented, thereby avoiding the disadvantages of conventional modulators. However, the elongate element 100 is apt to sag in the deformed state. The reason is that the elongate element 100 is uniformly subjected to an electrostatic attractive force acting toward the substrate in directions perpendicular to a longitudinal direction thereof, whereas tension of the elongate element 100 acts along the length of the elongate element 100. Therefore, the reflective surface of the elongate element is not planar but curvilinear.

However, the center part 102 of the elongate element 100 (FIG. 8) is almost planar, making the contrast ratio of diffracted light, gained by only the center part 102 of the elongate element 100, desirable. The substantially planar center part 102 has a length that is ⅓ of a distance between post holes 110. Hence, when the distance between the post holes 110 is 75 μm, the almost planar center part 102 is about 25 μm long.

FIG. 9 is a front view of the display element 200 in which the deformed elongate elements 100 are alternately arranged. FIG. 9 is a view taken in the direction of the arrows along the line B-B' of FIG. 8. The elongate ribbons 100 which are not removed are maintained at desired positions by an applied bias voltage. Deformation of the moving elongate ribbons 100 is achieved by alternate applications of operation voltages through the conductive layer 106 to the elongate elements 100. A vertical distance ($d_1$) is almost constant to the almost planar center part 102 (FIG. 8), thereby limiting the grating amplitude of the GLV. The grating amplitude ($d_1$) may be controlled by adjusting an operation voltage on the operated elongate elements 100. This results in precision tuning of the GLV in an optimum contrast ratio.

As for diffractive incident light having a single wavelength ($\lambda_1$), it is preferable that the GLV has a grating width ($d_1$) that is ¼ ($\lambda/4$) of the wavelength of incident light to assure a maximum contrast ratio in an image to be display deviceed. However, the grating width ($d_1$) requires only a round trip distance that is the same as the sum of a half of the wavelength ($\lambda_1$) and the whole number of the wavelength ($\lambda_1$) (i.e. $d_1=\lambda_1/4, 3\lambda_1/4, 5\lambda_1/4, \ldots, N\lambda_1/2+\lambda_1/4$).

Referring to FIG. 9, the lower side of each elongate element 100 is spaced upward from the substrate by a distance of $d_2$. Accordingly, the elongate elements 100 do not come into contact with the substrate during operation of the GLV. This results in avoidance of the sticking problems between the reflective ribbons and the substrate occurring in conventional modulators.

With reference to a hysteresis curve shown in FIG. 4, since the elongate elements 100 are moved by a distance that is ⅓-¼ of the distance between the elements and substrate to diffract incident light, hysteresis is prevented.

However, the light modulator which is manufactured by Silicon Light Machines Inc. and adopts an electrostatic method to control the position of a micromirror is disadvantageous in that an operation voltage is relatively high (usually 30 V or so) and a correlation between the applied voltage and a displacement is nonlinear, and thus, reliability is poor in the course of controlling light.

SUMMARY OF THE INVENTION

Therefore, the present invention has been made keeping in mind the above disadvantages occurring in the prior arts, and an object of the present invention is to provide a diffractive thin-film piezoelectric micromirror, which is operated by a piezoelectric operation method, unlike a conventional reflective diffractive light modulator operated by an electrostatic operation method, to assure excellent displacement, operation speed, reliability, linearity, and low voltage operation, and a method of producing the same.

Another object of the present invention is to provide a diffractive thin-film piezoelectric micromirror, which is operated by a thin-film piezoelectric operation method to make various structure designs on a silicon wafer possible, and a method of producing the same.

The above objects can be accomplished by providing a diffractive thin-film piezoelectric micromirror, including a substrate on which a recess is formed to provide an air space to the center thereof; and a piezoelectric mirror layer having a ribbon shape, which is attached to the substrate along both ends of the recess at both ends thereof while being spaced from the bottom of the recess at the center portion thereof and which includes a thin-film piezoelectric material layer to be vertically movable at the center portion thereof when voltage is applied to the piezoelectric material layer, and thus diffracts an incident light beam.

Additionally, the present invention provides a diffractive thin-film piezoelectric micromirror, including a substrate on which a recess is formed to provide an air space to the center thereof; a lower supporter which has a ribbon shape, is attached to an upper side of the substrate along both ends of the recess at both ends thereof while being spaced from the bottom of the recess at a center portion thereof, the center portion being vertically movable; and a piezoelectric mirror layer having a ribbon shape, which is laminated on the lower supporter while being spaced from the bottom of the recess of the substrate at both ends thereof and which includes a thin-film piezoelectric material layer to be vertically movable when voltage is applied to both sides of the thin-film piezoelectric material layer, and thus diffracts an incident light beam.

Furthermore, the present invention provides a diffractive thin-film piezoelectric micromirror, including a substrate on which a recess is formed to provide an air space to the center thereof; a lower supporter which has a ribbon shape, and is attached to an upper side of the substrate along both ends of the recess at both ends thereof while being spaced from the bottom of the recess at a center portion thereof; a first piezoelectric layer which is positioned on an end of the lower supporter at an end thereof and at a location far from a center of the lower supporter toward the end of the lower supporter by a predetermined distance at the other end thereof, and which includes a first thin-film piezoelectric material layer to shrink and expand so as to provide a first vertical actuating force when voltage is applied to the first thin-film piezoelectric material layer; a second piezoelectric layer which is positioned on the other end of the lower supporter at an end thereof and at a location far from the center of the lower supporter toward the other end of the lower supporter by a predetermined distance at the other end thereof, and which includes a second thin-film piezoelectric material layer to shrink and expand so as to provide a second vertical actuating force when voltage is applied to the second thin-film piezoelectric material layer; and a micromirror layer which is positioned at the center of the lower supporter to diffract an incident light beam.

As well, the present invention provides a diffractive thin-film piezoelectric micromirror, including a substrate on which an insulating layer is formed; a lower supporter which has a ribbon shape and is attached to the substrate at both ends thereof while being spaced from the substrate at the center portion thereof by a predetermined distance, the center portion being vertically movable; and a piezoelectric mirror layer which is laminated on the lower supporter while being spaced from the substrate at the center portion thereof, and includes a thin-film piezoelectric material layer to shrink and expand so as to vertically move at the center portion thereof when a voltage is applied to the piezoelectric material layer, and diffracting an incident light beam.

Furthermore, the present invention provides a diffractive thin-film piezoelectric micromirror, including a substrate on which an insulating layer is formed; a lower supporter which has a ribbon shape and is attached to both ends of the substrate at both ends thereof while being spaced from the substrate at the center portion thereof by a predetermined distance, the center portion being vertically movable; a first piezoelectric layer which is positioned on an end of the lower supporter at an end thereof and at a location far from the center of the lower supporter toward the end of the lower supporter by a predetermined distance at the other end thereof, and which includes a thin-film piezoelectric material layer to shrink and expand so as to be vertically moved when voltage is applied to the piezoelectric material layer; a second piezoelectric layer which is positioned on the other end of the lower supporter at an end thereof and at a location far from the center of the lower supporter toward the other end of the lower supporter by a predetermined distance at the other end thereof, and shrinks and expands so as to be vertically moved when a voltage is applied thereto; and a micromirror layer which is positioned at the center of the lower supporter to diffract an incident light beam.

Furthermore, the present invention provides a method of producing a diffractive thin-film piezoelectric micromirror, including a first step of forming a mask layer on a silicon wafer and patterning the mask layer to form a recess; a second step of forming a sacrificial layer so as to fill the recess formed in the first step; a third step of forming a piezoelectric mirror layer on the silicon wafer in which the recess is filled; a fourth step of etching the piezoelectric mirror layer formed in the third step to form a plurality of ribbons and removing the sacrificial layer to form the diffractive thin-film piezoelectric micromirror.

Furthermore, the present invention provides a method of producing a diffractive thin-film piezoelectric micromirror, including a first step of forming a mask layer on a silicon wafer and patterning the mask layer to form a recess; a second step of forming a sacrificial layer so as to fill the recess formed in the first step; a third step of forming a lower supporter on a silicon substrate in which the recess is filled; a fourth step of forming a pair of piezoelectric mirror layers on the lower supporter formed in the third step in such a way that each of the piezoelectric mirror layers is positioned on the remaining portion of the substrate other than the recess at an end thereof and at a location far from the center of the recess outward by a predetermined distance at the other end thereof, and the piezoelectric mirror layers are opposite to each other; a fifth step of forming a micromirror layer on the center portion of the lower supporter; and a sixth step of etching a pair of piezoelectric mirror layers and the lower supporter to form a plurality of ribbons and removing the sacrificial layer to form the diffractive thin-film piezoelectric micromirror.

Furthermore, the present invention provides a method of producing a diffractive thin-film piezoelectric micromirror, including a first step of laminating a sacrificial layer on a silicon substrate, forming a mask layer, and etching the resulting substrate to form a raised part; a second step of laminating a lower supporter on the silicon substrate on which the raised part is formed in the first step; a third step of forming a piezoelectric mirror layer on the lower supporter formed in the second step; and a fourth step of etching the piezoelectric mirror layer formed in the third step to form a plurality of ribbons and removing the sacrificial layer to form the diffractive thin-film piezoelectric micromirror.

Furthermore, the present invention provides a method of producing a diffractive thin-film piezoelectric micromirror, including a first step of laminating a sacrificial layer on a silicon substrate, forming a mask layer, and etching the resulting substrate to form a raised part; a second step of laminating a lower supporter on the silicon substrate on which the raised part is formed in the first step; a third step of forming a pair of piezoelectric mirror layers on the lower supporter formed in the second step in such a way that each of the piezoelectric mirror layers is positioned on the remaining portion of the substrate other than the raised part at an end thereof and at a location far from the center of the raised part outward by a predetermined distance at the other end thereof, and the piezoelectric mirror layers are opposite to each other; a fourth step of forming a micromirror layer on the center of the lower supporter; and a fifth step of etching a plurality of piezoelectric mirror layers and the lower supporter to form a plurality of ribbons and removing the sacrificial layer to form the diffractive thin-film piezoelectric micromirror.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of a preferred embodiment according to the present invention, referring to FIGS. 10a to 10j.

FIGS. 10a to 10j illustrate production of a diffractive thin-film piezoelectric micromirror having a recess according to an embodiment of the present invention.

Figure 1:
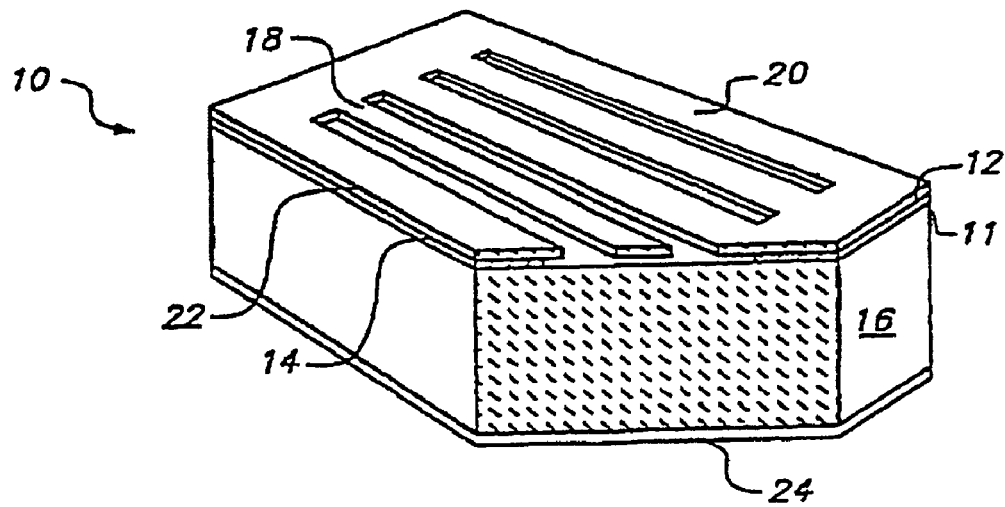
FIG. 1 illustrates a grating light modulator adopting an electrostatic method according to a conventional technology.
Figure 2:
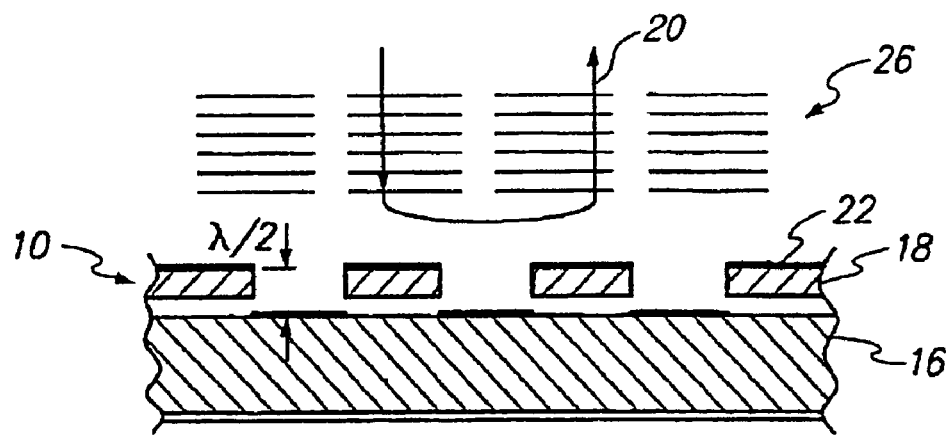
FIG. 2 illustrates reflection of incident light by the grating light modulator adopting the electrostatic method according to the conventional technology in an undeformed state.
Figure 3:
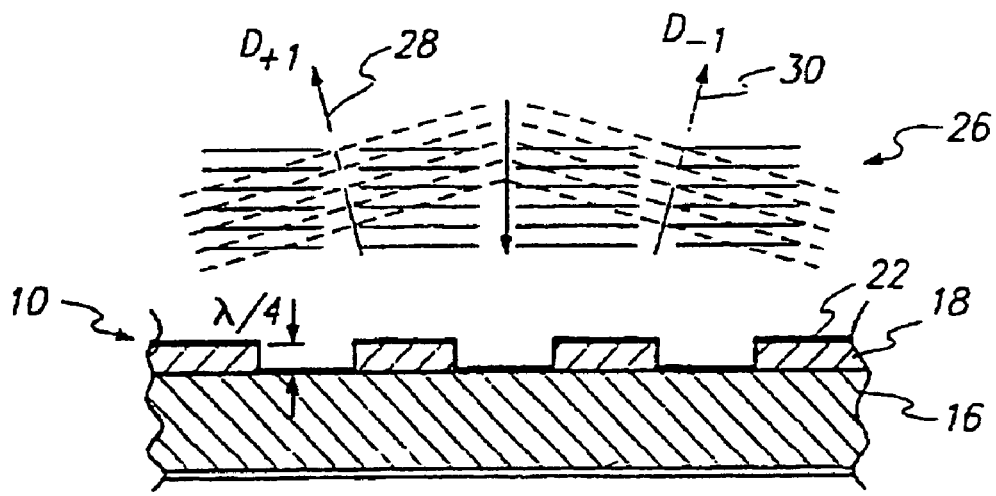
FIG. 3 illustrates diffraction of incident light by the grating light modulator in a deformed state due to an electrostatic force according to the conventional technology.
Figure 4:
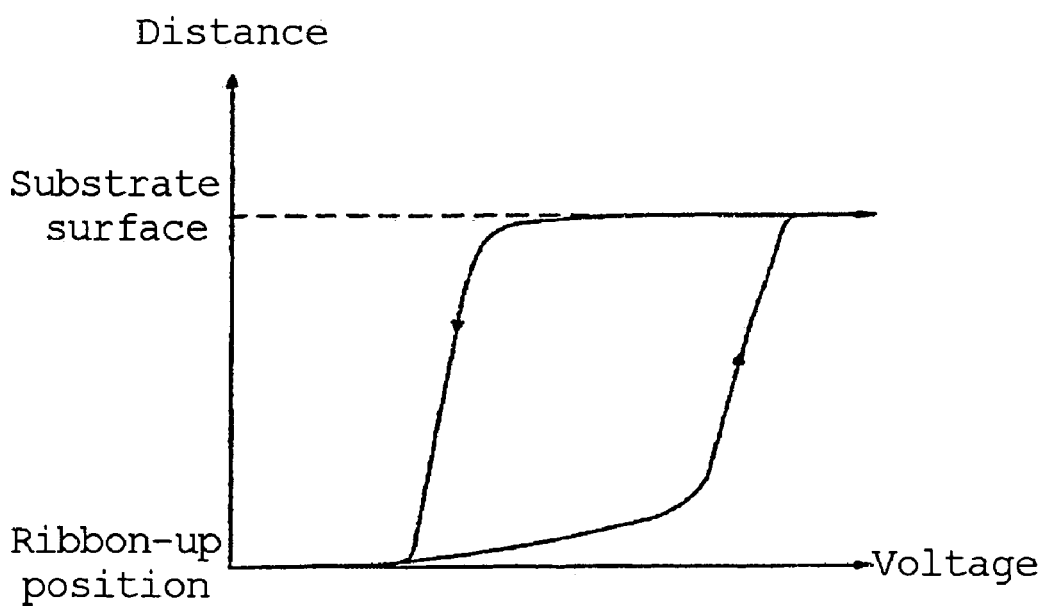
FIG. 4 illustrates a hysteresis curve for the grating light modulator adopting the electrostatic method according to the conventional technology.
Figure 5:
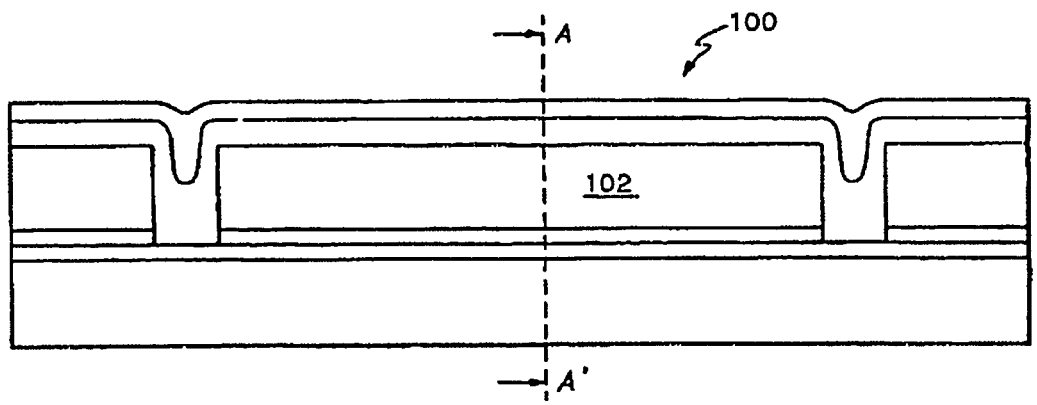
FIG. 5 is a side sectional view of a column-type diffractive grating light valve adopting an electrostatic method according to a conventional improved technology.
Figure 6:
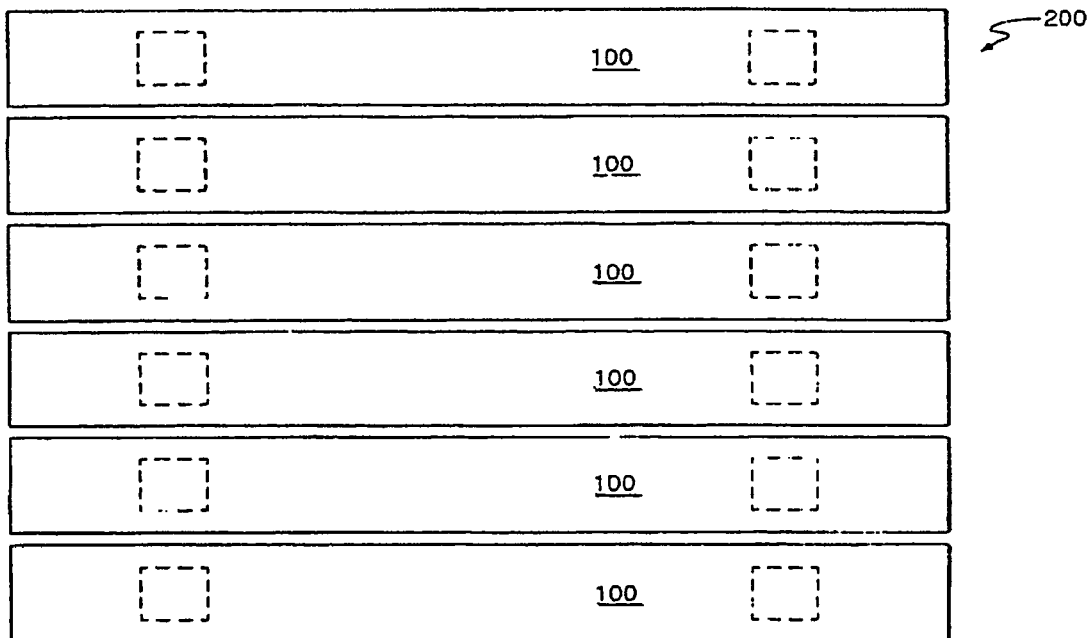
FIG. 6 is a plan view of a portion of the grating light valve (GLV) including six elongate elements corresponding to a single display element according to the conventional improved technology.
Figure 7:
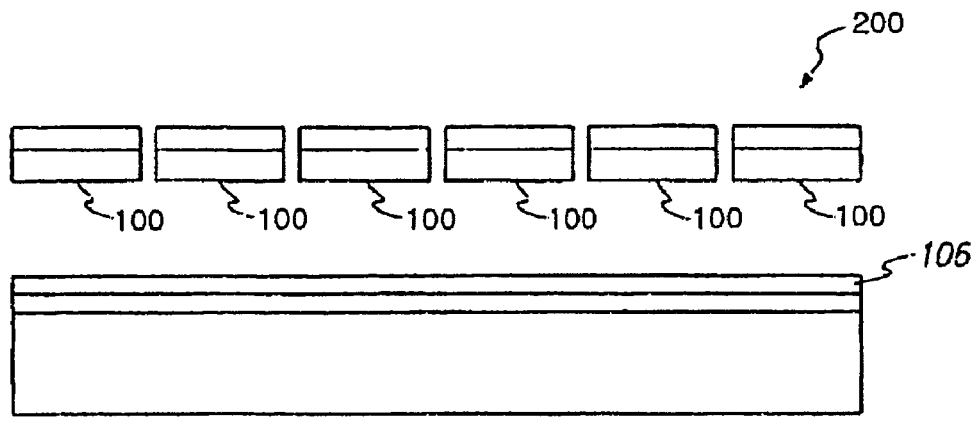
FIG. 7 is a front sectional view of the display element of the GLV including the six elongate elements according to the conventional improved technology, which reflects incident light in an undeformed state.
Figure 8:
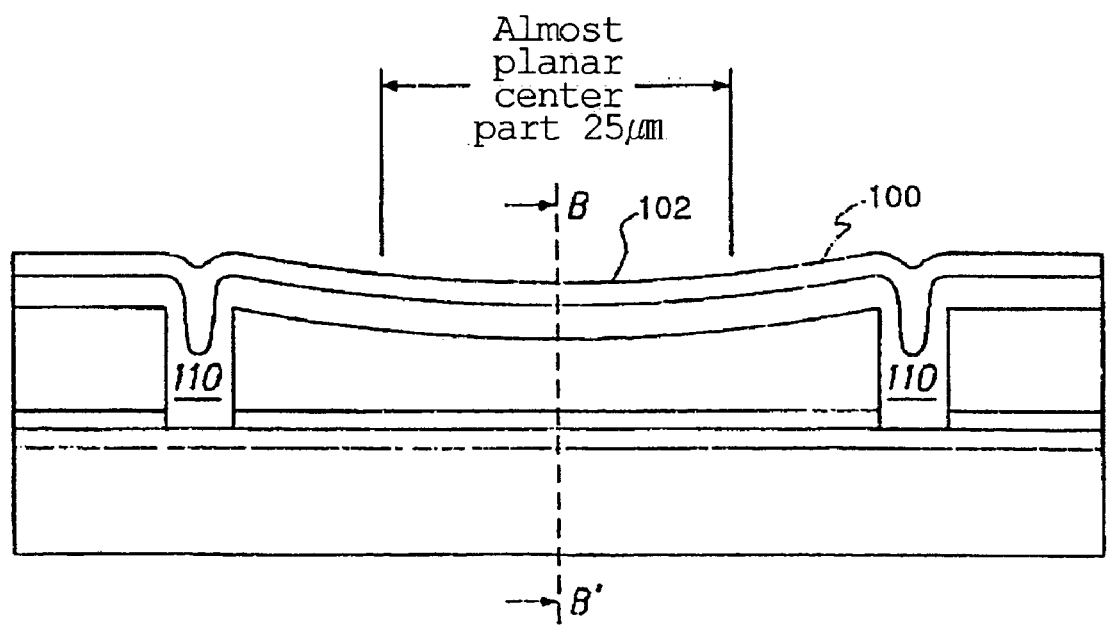
FIG. 8 is a side sectional view of an elongate element of the GLV according to the conventional improved technology, which is deformed by an electrostatic force.
Figure 9:
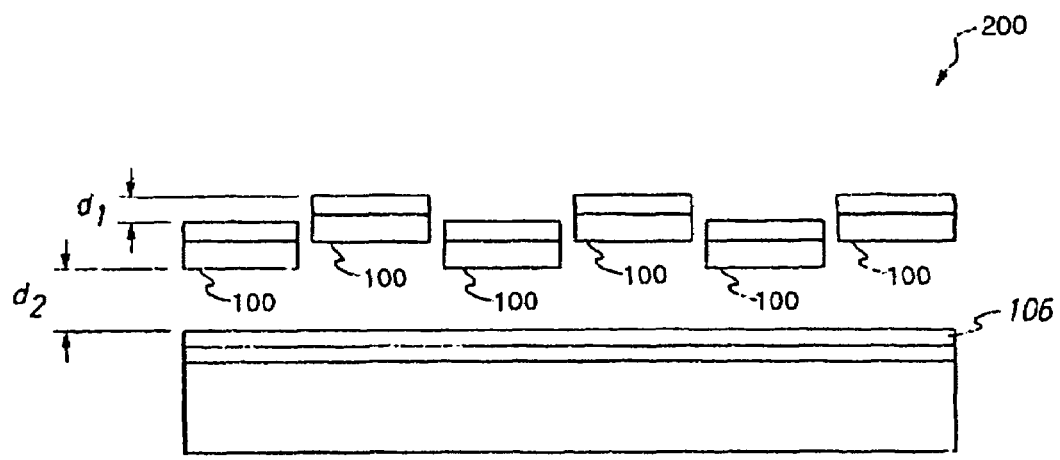
FIG. 9 is a front sectional view of the display element of the GLV including the six alternately arranged elongate elements, which diffracts incident light in a deformed state caused by an electrostatic force according to the conventional improved technology.
Figure 10A:
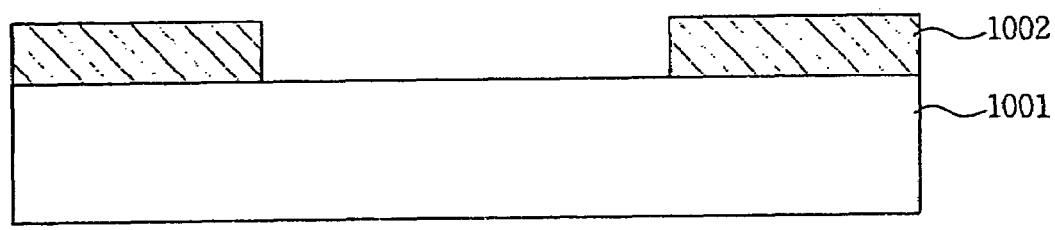
FIGS. 10a to 10j illustrate production of a diffractive thin-film piezoelectric micromirror having a recess according to an embodiment of the present invention.

Referring to FIG. 10a, a mask layer 1002 is formed in a thickness of 0.1-1.0 μm through a thermal oxidation process on a silicon wafer 1001, and then patterned for silicon etching.

Figure 10B:

With reference to FIG. 10b, the silicon is etched in a predetermined thickness, using a solution capable of etching the silicon, such as TMAH or KOH, and the mask layer 1002 is then removed. In this regard, it is possible to conduct a dry etching as well as a wet etching.

Figure 10C:
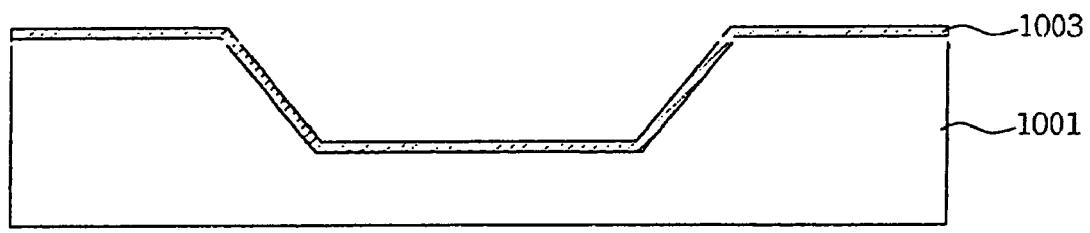

Referring to FIG. 10c, an insulating and etching prevention layer 1003 is formed on the etched silicon according to the thermal oxidation process. That is to say, the insulating and etching prevention layer 1003, such as $SiO_2$, is formed on a surface of the silicon wafer.

Figure 10D:
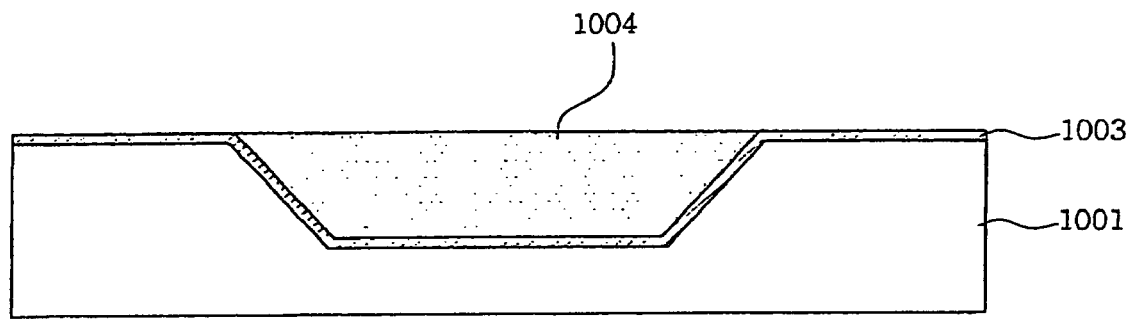

Referring to FIG. 10d, a polysilicon (Poly-Si) or an amorphous-Si is deposited on an etched portion of the silicon wafer 1001 according to low pressure chemical vapor deposition (LPCVD) or plasma chemical vapor deposition (PECVD) processes to form a sacrificial layer 1004 for an air space, and the resulting silicon wafer is polished to be flattened at a surface thereof. In this respect, in the case of using a silicon on insulator (SOI), the deposition of the polysilicon and polishing may be omitted.

Subsequently, silicon nitrides, such as $Si_3N_4$, are deposited in a preferable thickness of 0.1-5.0 μm according to the LPCVD or PECVD processes, and $SiO_2$ is deposited in a thickness of 0.1-5 μm according to thermal oxidation or PECVD processes, but this procedure may be omitted according to necessity.

Figure 10E:
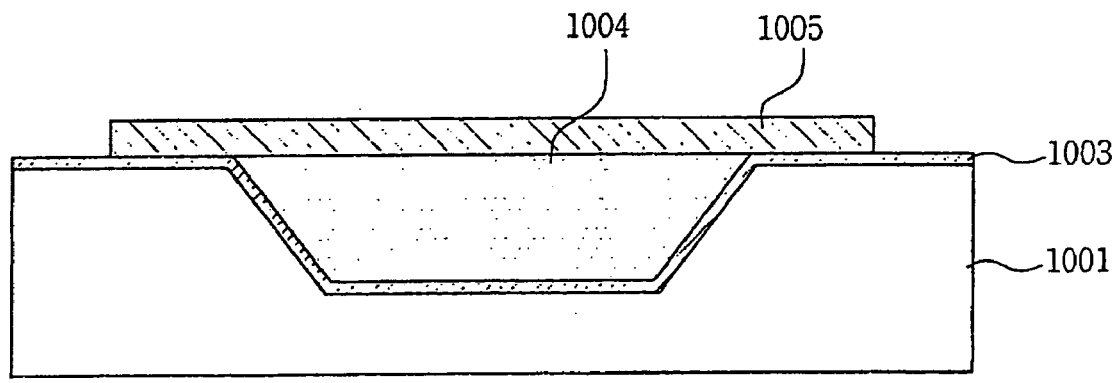

Referring to FIG. 10e, a lower supporter 1005 for supporting the piezoelectric material is deposited on the silicon wafer 1001. A material constituting the lower supporter 1005 may be exemplified by Si oxides (e.g. $SiO_2$, etc.), Si nitrides (e.g. $Si_3N_4$, etc.), ceramic substrates (Si, $ZrO_2$, $Al_2O_3$ and the like), and Si carbides. The lower supporter 1005 may be omitted, if necessary.

Figure 10F:
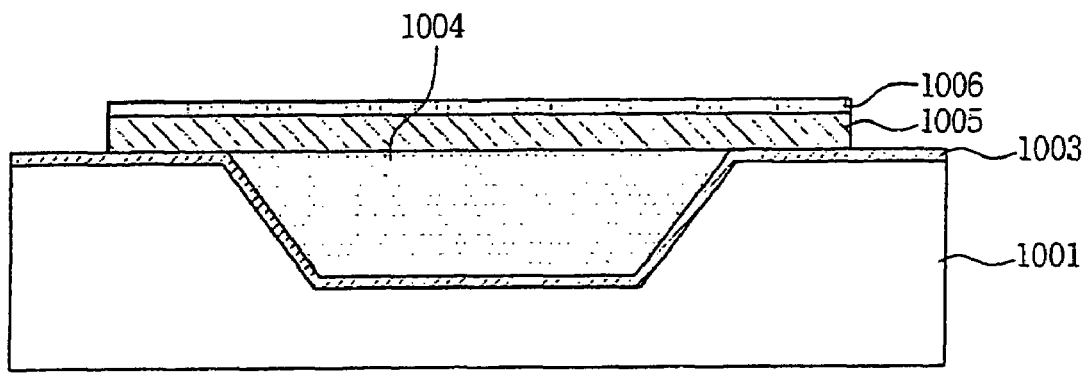

Referring to FIG. 10f, a lower electrode 1006 is formed on the lower supporter 1005, in which examples of material for the lower electrode 1006 may include Pt, Ta/Pt, Ni, Au, Al, $RuO_2$ and the like. In this case, the material is deposited in a thickness of 0.01-3 μm using sputtering or evaporation processes.

Figure 10G:
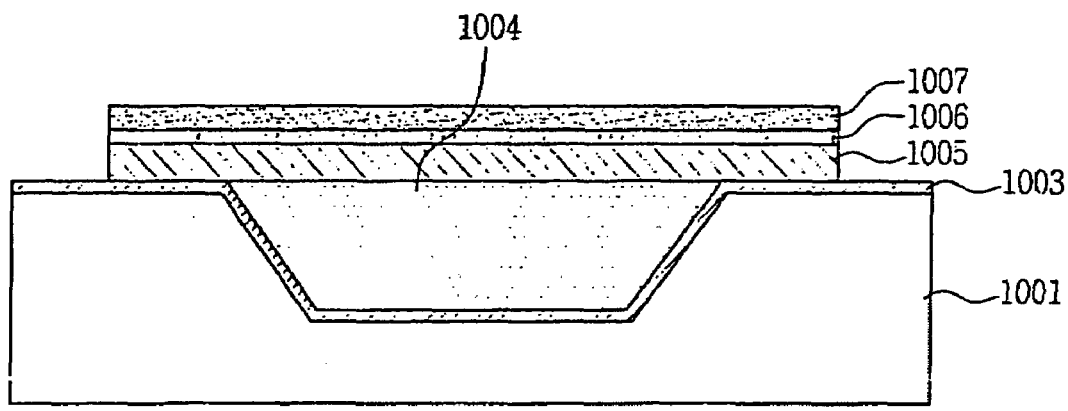

Referring to FIG. 10g, a piezoelectric material 1007 is formed in a thickness of 0.01-20.0 μm on the lower electrode 1006 according to a wet process (screen printing, sol-gel coating and the like) or a dry process (sputtering, evaporation, vapor deposition and the like). Both longitudinal type and transverse type piezoelectric materials may be used as the piezoelectric material 1007. Examples of the piezoelectric material may include PzT, PNN-PT, ZnO and the like, and the piezoelectric electrolytic material contains at least one selected from the group consisting of Pb, Zr, Zn, or titanium.

Figure 10H:
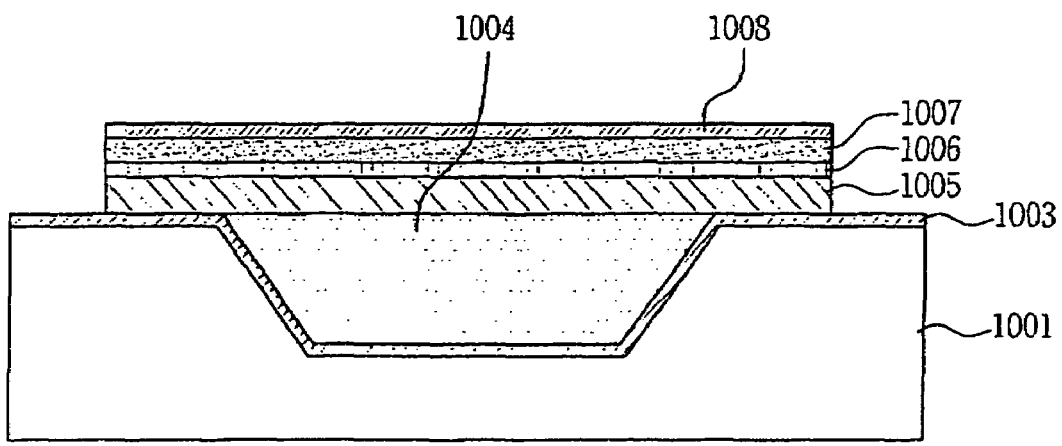

Referring to FIG. 10*h*, an upper electrode 1008 is formed on the piezoelectric material 1007, in which a material of the upper electrode may be exemplified by Pt, Ta/Pt, Ni, Au, Al, and $RuO_2$. In this case, the upper electrode is formed in a thickness of 0.01-3 μm using the sputtering or evaporation processes.

Figure 10I:
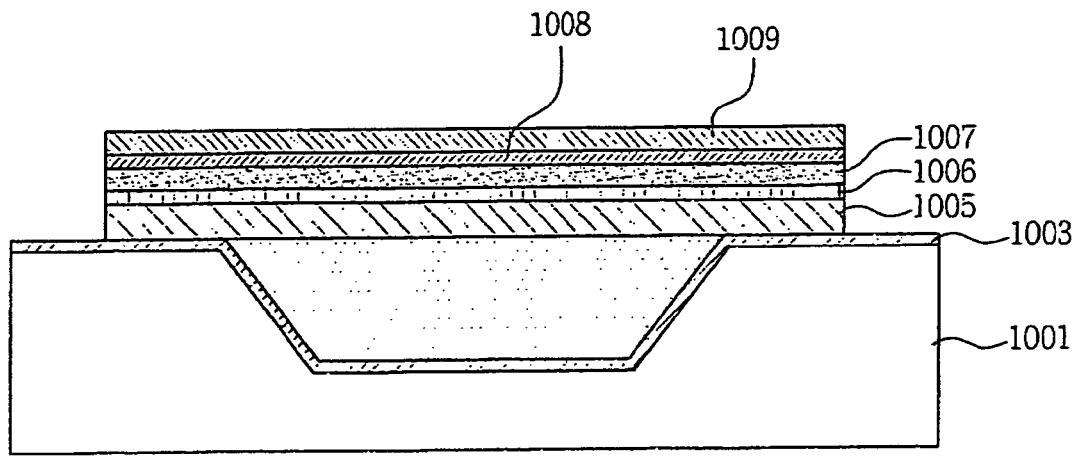

Referring to FIG. 10*i*, a micromirror 1009 is attached to the upper electrode 1008, in which examples of a material of the micromirror include a light-reflective material, such as Ti, Cr, Cu, Ni, Al, Au, Ag, Pt, and Au/Cr.

At this time, the upper electrode 1008 may be used as the micromirror, or a separate micromirror may be deposited on the upper electrode 1008.

Figure 10J:
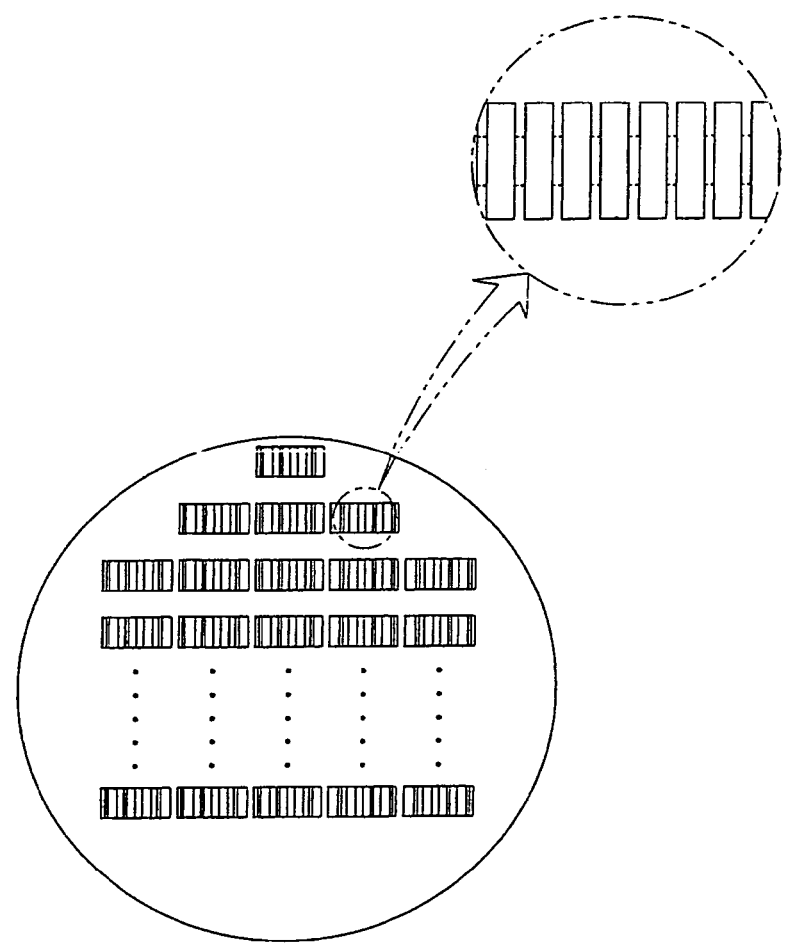

Referring to FIG. 10*j*, after such a mother body of a diffractive thin-film piezoelectric micromirror array is patterned using a mask layer, such as a photoresist, the micromirror 1009, upper electrode 1008, piezoelectric material 1007, lower electrode 1006, and lower supporter 1005 are etched to form the diffractive thin-film piezoelectric micromirror array. Subsequently, the sacrificial layer 1004 is etched using $XeF_2$ gas.

Heretofore, there has been described removal of the sacrificial layer 1004 after the diffractive thin-film piezoelectric micromirror array is formed from the mother body of the diffractive thin-film piezoelectric micromirror array, but the micromirror array may be formed after the sacrificial layer 1004 is removed.

In other words, a hole is formed in a portion of the mother body of the diffractive thin-film piezoelectric micromirror array, on which the lower supporter 1005 is not formed, and the sacrificial layer 1004 is etched using $XeF_2$ gas. Subsequently, the mother body of the diffractive thin-film piezoelectric micromirror array is patterned using the mask layer, such as the photoresist, and the micromirror 1009, upper electrode 1008, piezoelectric material 1007, lower electrode 1006, and lower supporter 1005 are etched to form the micromirror array.

Figure 11A:
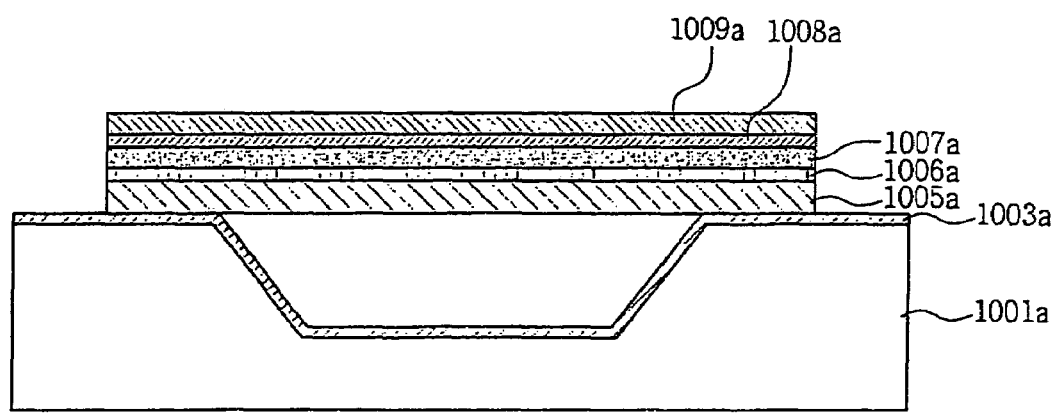
FIGS. 11a to 11c illustrate various diffractive thin-film piezoelectric micromirrors having recesses, in which piezoelectric materials are not deformed.
Figure 11B:
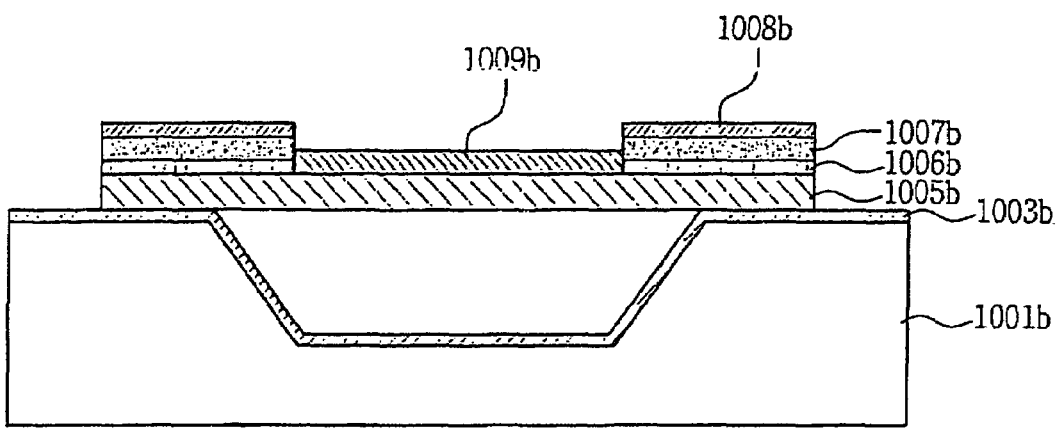
Figure 11C:
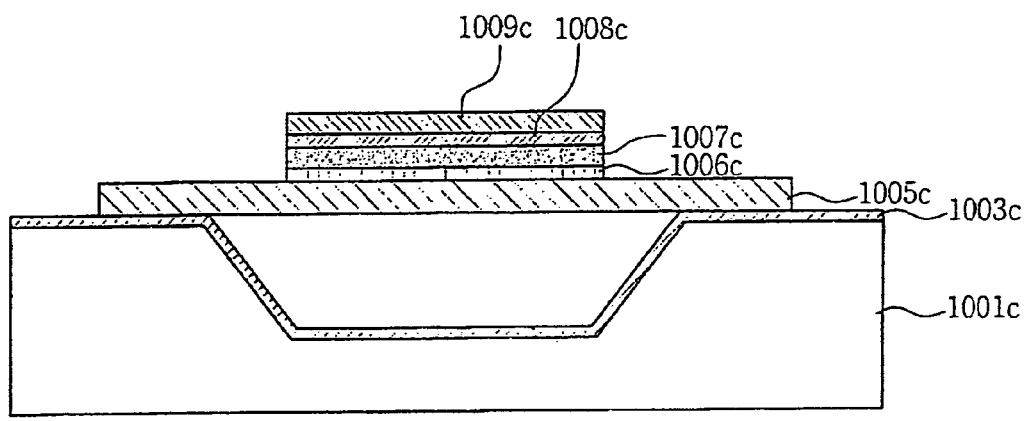

FIGS. 11*a* to 11*c* illustrate various diffractive thin-film piezoelectric micromirrors having recesses, in which piezoelectric materials are not deformed.

FIG. 11*a* illustrates that a sacrificial layer of a silicon wafer is replaced with an air space, and thus, a piezoelectric material is partially spaced from a surface of a substrate and supported by ends thereof. Additionally, a lower electrode 1006*a*, a piezoelectric material layer 1007*a*, an upper electrode 1008*a*, and a micromirror 1009*a* are positioned on a lower supporter 1005*a*.

FIG. 11*b* illustrates that a sacrificial layer of a silicon wafer is replaced with an air space, and thus, a piezoelectric material is partially spaced from a surface of a substrate and supported by ends thereof. In this respect, a micromirror 1009*b* is positioned on the center part of a lower supporter 1005*b*. Furthermore, a lower electrode 1006*b*, a piezoelectric material layer 1007*b*, and an upper electrode 1008*b* are positioned on both ends of a lower supporter 1005*b*. To produce such a diffractive thin-film piezoelectric micromirror, after the upper electrode 1008*b* is formed, the center portions of the lower electrode 1006*b*, piezoelectric material layer 1007*b*, and upper electrode 1008*b* are etched, and the micromirror 1009*b* is then formed on the center part.

FIG. 11*c* illustrates that a sacrificial layer of a silicon wafer is replaced with an air space, and thus, a piezoelectric material is partially spaced from a surface of a substrate and supported by ends thereof. In this regard, a lower electrode 1006*c*, a piezoelectric material layer 1007*c*, an upper electrode 1008*c*, and a micromirror 1009*c* are positioned on the center part of a lower supporter 1005*c*.

Figure 12A:
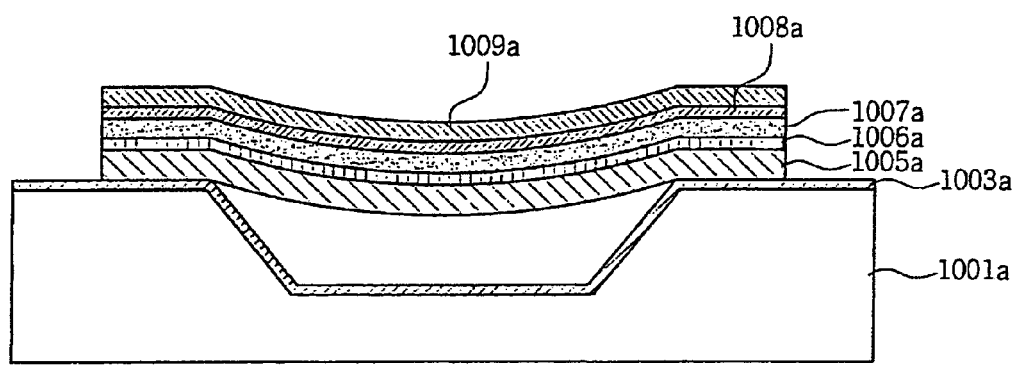
FIGS. 12a to 12c illustrate various diffractive thin-film piezoelectric micromirrors having recesses, in which piezoelectric materials are deformed.
Figure 12B:
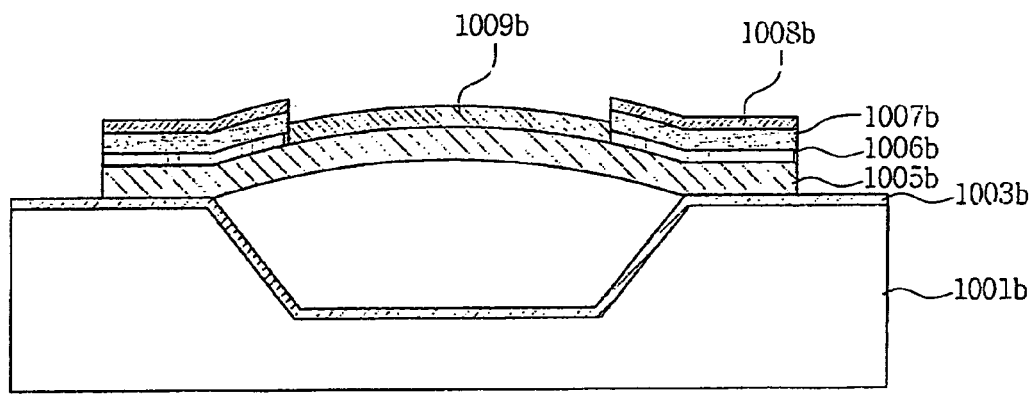
Figure 12C:
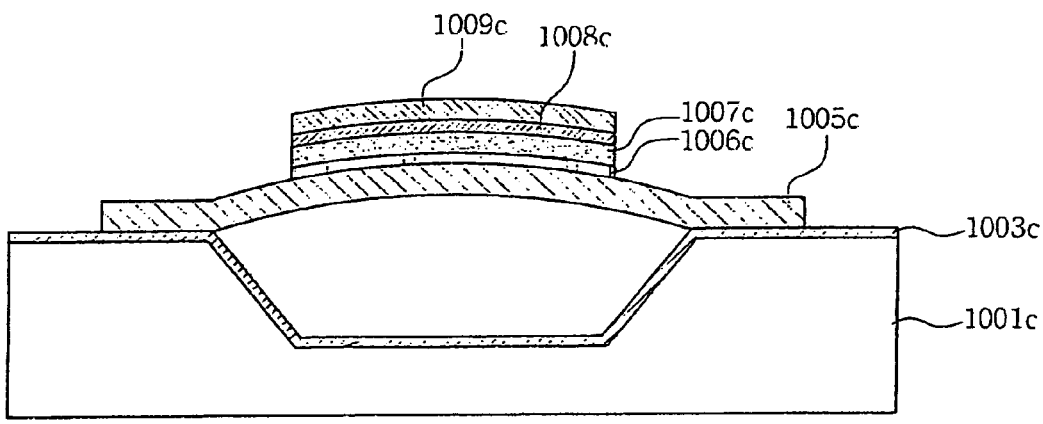

FIGS. 12*a* to 12*c* illustrate various diffractive thin-film piezoelectric micromirrors having recesses, in which piezoelectric materials are deformed.

FIG. 12*a* shows that when voltage is applied to upper and lower parts of a piezoelectric material 1007*a*, a lower supporter 1005*a*, a lower electrode 1006*a*, a piezoelectric material layer 1007*a*, an upper electrode 1008*a*, and a micromirror 1009*a* are warped downward by contractile and expansive forces of the piezoelectric material. At this time, the contractile force acts on the piezoelectric material 1007*a* in a horizontal direction, causing the piezoelectric material 1007*a* to shrink in a horizontal direction. However, since a lower side of the piezoelectric material 1007*a* is firmly attached to the lower supporter 1005*a*, the contractile force causes the piezoelectric material 1007*a* to be warped downward.

FIG. 12*b* shows that when voltage is applied to upper and lower sides of a piezoelectric material layer 1007*b* positioned on both ends of a lower supporter 1005*b*, a contractile force is generated in a horizontal direction. At this time, the contractile force acts on the piezoelectric material 1007*b* in the horizontal direction, causing the piezoelectric material 1007*b* to shrink in the horizontal direction. However, since a lower side of the piezoelectric material 1007*b* is firmly attached to the lower supporter 1005*b*, the contractile force causes the piezoelectric material 1007*b* to be warped upward. As a result, the lower supporter 1005*b* and a micromirror 1009*b* positioned on the center of the lower supporter 1005*b* are warped upward.

FIG. 12*c* shows that when voltage is applied to upper and lower sides of a piezoelectric material 1007*c* positioned on the center of a lower supporter 1005*c*, a lower electrode 1006*c*, a piezoelectric material layer 1007*c*, an upper electrode 1008*c*, and a micromirror 1009*c* are warped upward.

Figure 13A:
FIGS. 13a to 13b illustrate operation of a display element in which diffractive thin-film piezoelectric micromirrors having recesses and the same or different dimensions are alternately arranged, and FIG. 13c illustrate operation of a display element in which diffractive thin-film piezoelectric micromirrors having recesses are arranged at regular intervals.
Figure 13A:
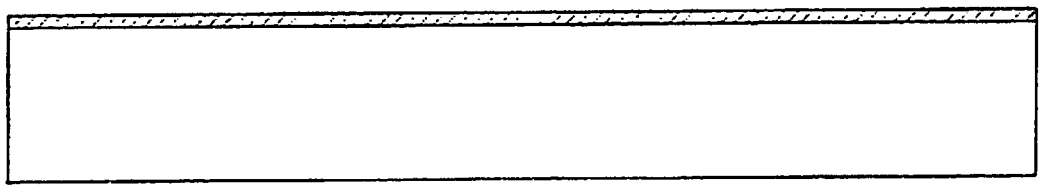

FIG. 13*a* illustrates operation of a display element in which diffractive thin-film piezoelectric micromirrors having recesses and the same dimensions are arranged. The diffractive thin-film piezoelectric micromirrors are vertically moved by the application of voltage.

Figure 13B:
Figure 13B:
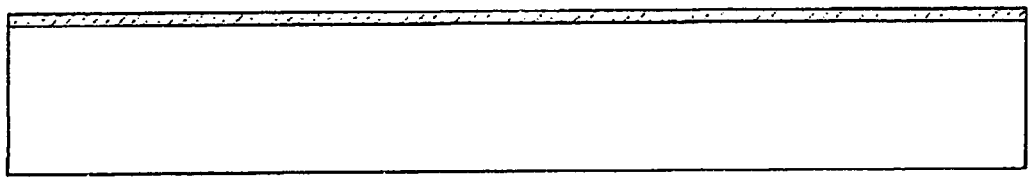

FIG. 13*b* illustrates operation of a display element in which diffractive thin-film piezoelectric micromirrors having recesses and different dimensions are alternately arranged. The diffractive thin-film piezoelectric micromirrors are vertically moved by the application of voltage.

Figure 13C:
Figure 13C:
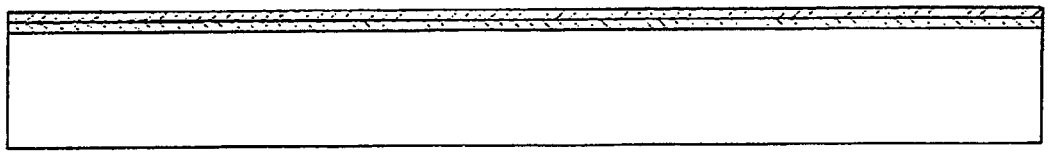

FIG. 13*c* illustrates operation of a display element in which diffractive thin-film piezoelectric micromirrors having recesses and the same dimension are arranged. At this time, the micromirrors are formed on a whole upper side of an insulating layer to diffract incident light.

FIGS. 14*a* to 14*h* illustrate production of a thin-film piezoelectric light modulator having a raised part according to another embodiment of the present invention.

Figure 14A:
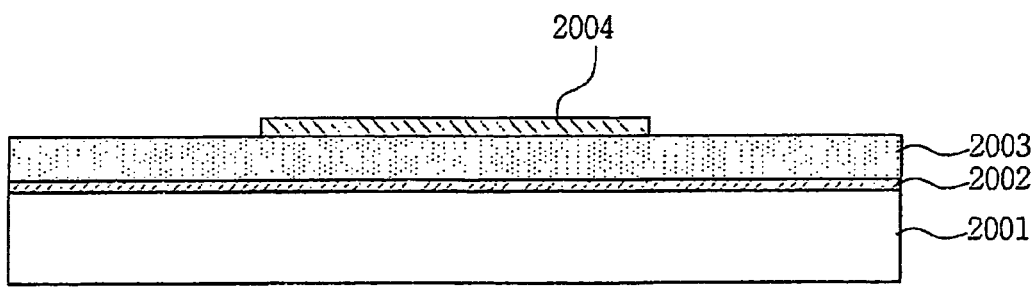
FIGS. 14a to 14h illustrate production of a thin-film piezoelectric light modulator having a raised part according to another embodiment of the present invention.

Referring to FIG. 14*a*, an insulating and etching prevention layer 2002 is formed on a silicon wafer according to the thermal oxidation process. That is to say, the insulating and etching prevention layer 2002 made of $SiO_2$ is formed on a surface of the silicon wafer.

Additionally, a polysilicon (Poly-Si) or an amorphous-Si is deposited on the insulating and etching prevention layer 2002 of the silicon wafer 2001 according to LPCVD or PECVD processes to form an air space, and the resulting silicon wafer is polished to be flattened at a surface thereof to form a sacrificial layer 2003.

Subsequently, a mask layer 2004 is formed in a thickness of 0.1-3.0 μm through a thermal oxidation process on the sacrificial layer 2003, and then patterned for silicon etching.

Figure 14B:
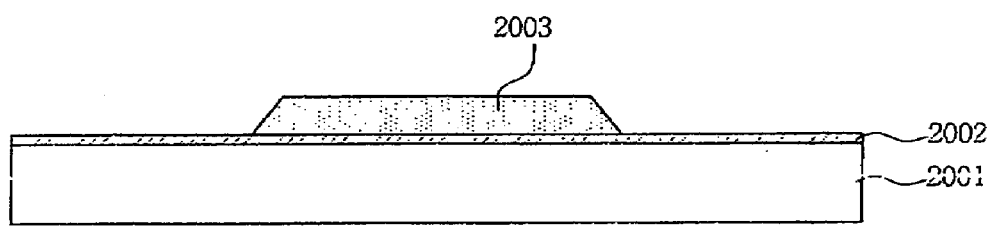

With reference to FIG. 14b, silicon is etched using a solution capable of etching silicon, such as TMAH or KOH, in a predetermined thickness, and the mask layer 2004 is then removed.

Next, after silicon nitrides, such as $Si_3N_4$, are deposited in a preferable thickness of 0.1-5.0 μm according to the LPCVD or PECVD processes, $SiO_2$ is deposited in a thickness of 0.1-3 μm according to thermal oxidation or PECVD processes, but this procedure may be omitted according to necessity.

Figure 14C:
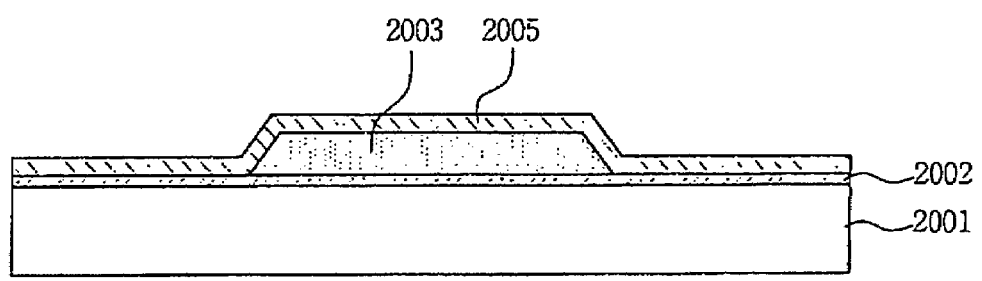

Successively, referring to FIG. 14c, a lower supporter 2005 for supporting a piezoelectric material is deposited on the insulating and etching prevention layer 2002 and sacrificial layer 2003. In this case, a material constituting the lower supporter 2005 may be exemplified by Si oxides (e.g. $SiO_2$, etc.), Si nitrides (e.g. $Si_3N_4$, etc.), ceramic substrates (e.g. Si, $ZrO_2$, $Al_2O_3$ and the like), and Si carbides. The lower supporter 2005 may be omitted, if necessary.

Figure 14D:
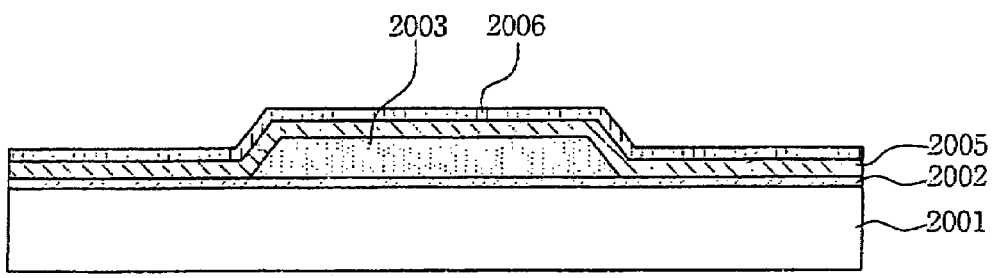

Referring to FIG. 14d, a lower electrode 2006 is formed on the lower supporter 2005, in which examples of material for the lower electrode 2006 may include Pt, Ta/Pt, Ni, Au, Al, $RuO_2$ and the like, and the material is deposited in a thickness of 0.01-3 μm using sputtering or evaporation processes.

Figure 14E:
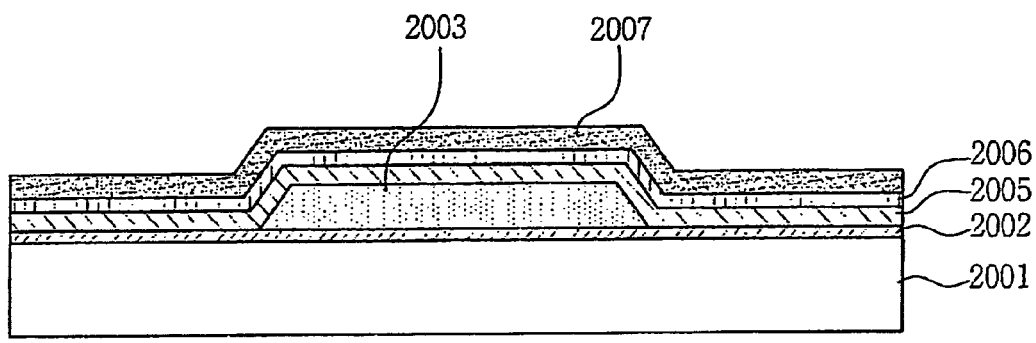

Referring to FIG. 14e, a piezoelectric material 2007 is formed in a thickness of 0.01-20.0 μm on the lower electrode 2006 according to a wet process (screen printing, sol-gel coating and the like) or a dry process (sputtering, evaporation, vapor deposition and the like). Both longitudinal type and transverse type piezoelectric materials may be used as the piezoelectric material 2007. Examples of the piezoelectric material may include PZT, PMN-PT, PLZT, AlN, ZnO and the like, and the piezoelectric electrolytic material contains at least one selected from the group consisting of Pb, Zr, Zn, or titanium.

Figure 14F:
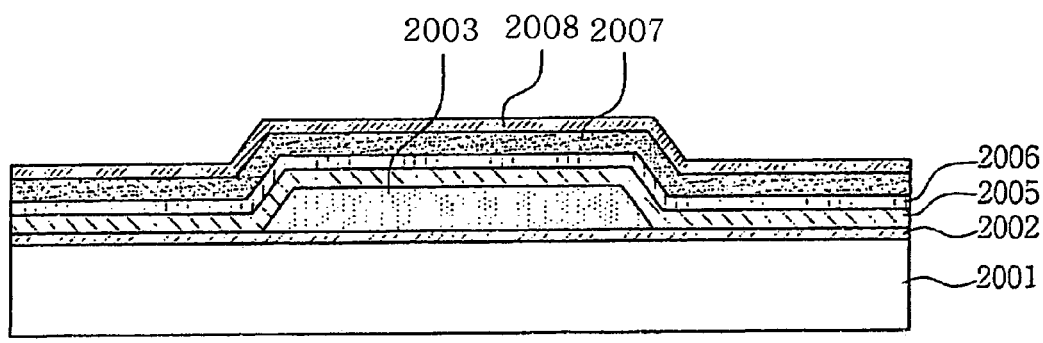

Referring to FIG. 14f, an upper electrode 2008 is formed on the piezoelectric material 2007, in which a material of the upper electrode may be exemplified by Pt, Ta/Pt, Ni, Au, Al, Ti/Pt, $IrO_2$ and $RuO_2$, and the upper electrode is formed in a thickness of 0.01-3 μm using the sputtering or evaporation processes.

Figure 14G:
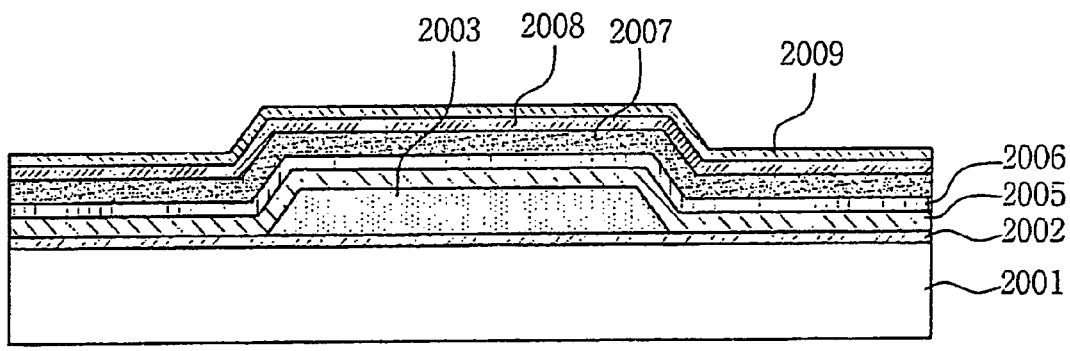

Referring to FIG. 14g, a micromirror 2009 is attached to the upper electrode 2008. Examples of a material of the micromirror include a light-reflective material, such as Ti, Cr, Cu, Ni, Al, Au, Ag, Pt, and Au/Cr.

At this time, the upper electrode 2008 may be used as the micromirror, or a separate micromirror may be deposited on the upper electrode 2008.

Figure 14H:
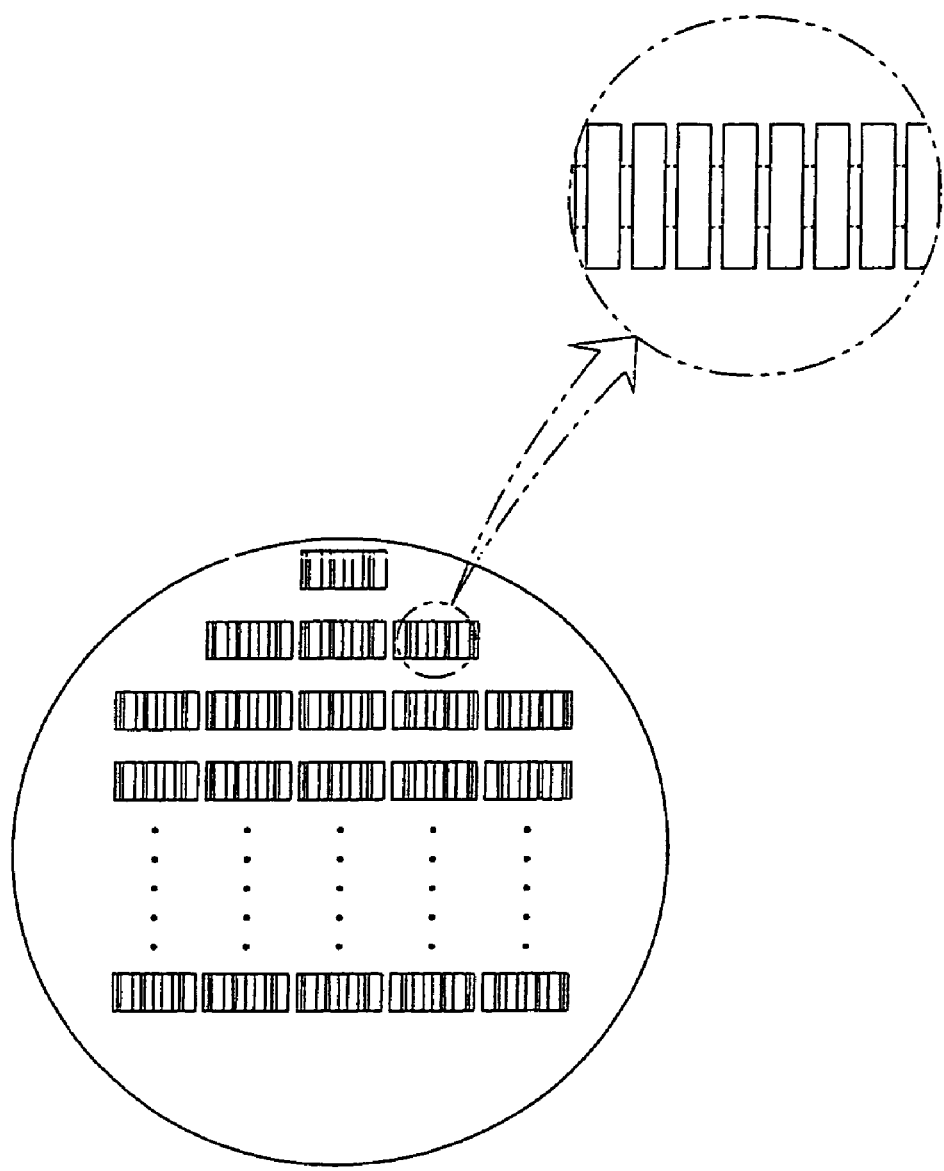

Referring to FIG. 14h, after such a mother body of a diffractive thin-film piezoelectric micromirror array is patterned using a mask layer, such as a photoresist, the micromirror 2009, upper electrode 2008, piezoelectric material 2007, lower electrode 2006, and lower supporter 2005 are etched to form the diffractive thin-film piezoelectric micromirror array. Subsequently, the sacrificial layer 2003 is etched using $XeF_2$ gas.

Heretofore, there has been described removal of the sacrificial layer 2003 after the diffractive thin-film piezoelectric micromirror array is formed from the mother body of the diffractive thin-film piezoelectric micromirror array, but the micromirror array may be formed after the sacrificial layer 2003 is removed.

In other words, a hole is formed in a portion of the mother body of the diffractive thin-film piezoelectric micromirror array, in which the lower supporter 2005 is not formed, the sacrificial layer 2003 is etched using $XeF_2$ gas. The mother body of the diffractive thin-film piezoelectric micromirror array is patterned using the mask layer, such as the photoresist, and the micromirror 2009, upper electrode 2008, piezoelectric material 2007, lower electrode 2006, and lower supporter 2005 are etched to form the micromirror array.

Figure 15A:
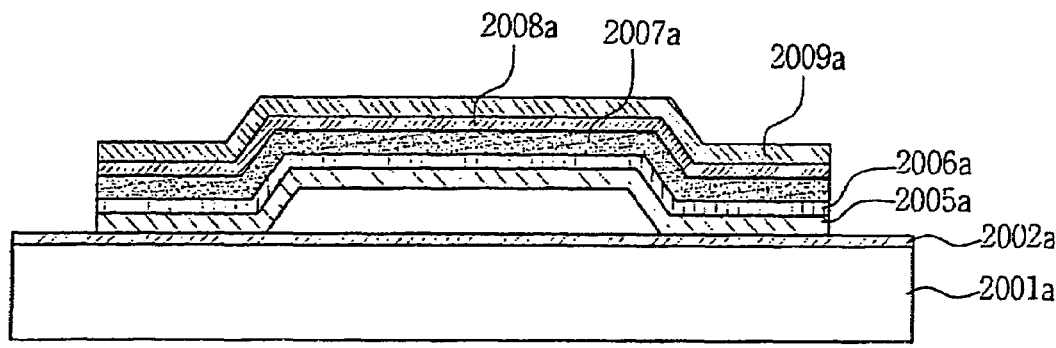
FIGS. 15a to 15c illustrate various diffractive thin-film piezoelectric micromirrors having raised parts, in which piezoelectric materials are not deformed.
Figure 15B:
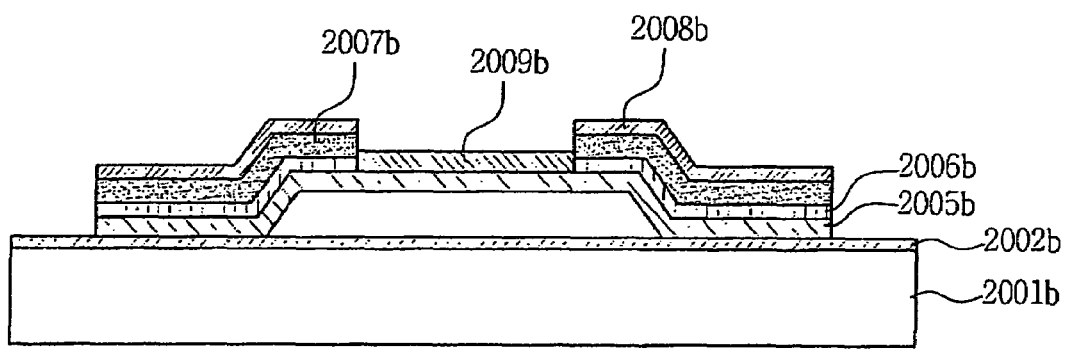
Figure 15C:
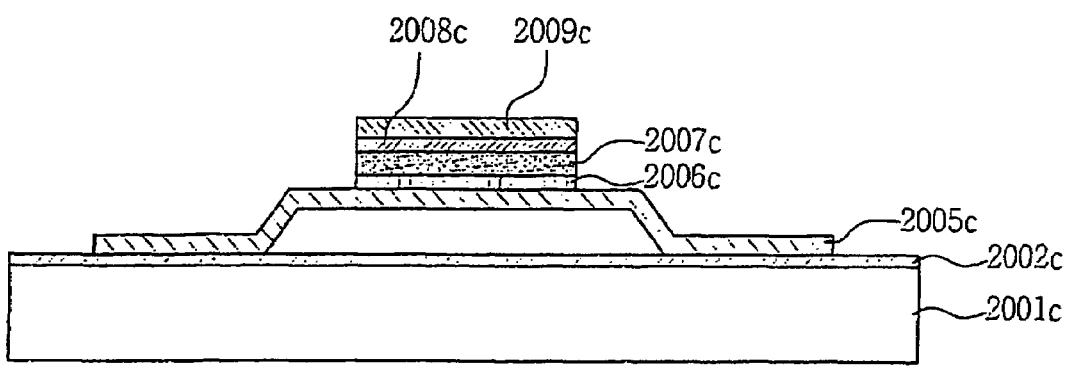

FIGS. 15a to 15c illustrate various diffractive thin-film piezoelectric micromirrors having raised parts, in which piezoelectric materials are not deformed.

FIG. 15a illustrates that a sacrificial layer of a silicon wafer is replaced with an air space, and thus, a piezoelectric material is partially spaced from a surface of a substrate and supported by ends thereof. Additionally, a lower electrode 2006a, a piezoelectric material layer 2007a, an upper electrode 2008a, and a micromirror 2009a are positioned on a lower supporter 2005a. FIG. 15a is different from FIG. 11a in that a portion of the piezoelectric material is raised upward and spaced from an insulating and etching prevention layer.

FIG. 15b illustrates that a sacrificial layer of a silicon wafer is replaced with an air space, and thus, a piezoelectric material is partially spaced from a surface of a substrate and supported by ends thereof. In this respect, a micromirror 2009b is positioned on the center part of a lower supporter 2005b. Furthermore, a lower electrode 2006b, a piezoelectric material layer 2007b, and an upper electrode 2008b are positioned on both ends of the lower supporter 2005b. To produce such a diffractive thin-film piezoelectric micromirror, after the upper electrode 2008b is formed, the center portions of the lower electrode 2006b, piezoelectric material layer 2007b, and upper electrode 2008b are etched, and the micromirror 2009b is then formed on the center part. FIG. 15b is different from FIG. 11b in that a portion of the piezoelectric material is raised upward and spaced from an insulating and etching prevention layer.

FIG. 15c illustrates that a sacrificial layer of a silicon wafer is replaced with an air space, and thus, a piezoelectric material is partially spaced from a surface of a substrate by ends thereof. In this regard, a lower electrode 2006c, a piezoelectric material layer 2007c, an upper electrode 2008c, and a micromirror 2009c are positioned on the center part of a lower supporter 2005c. FIG. 15c is different from FIG. 11c in that a portion of the piezoelectric material is raised upward and spaced from an insulating and etching prevention layer.

Figure 16A:
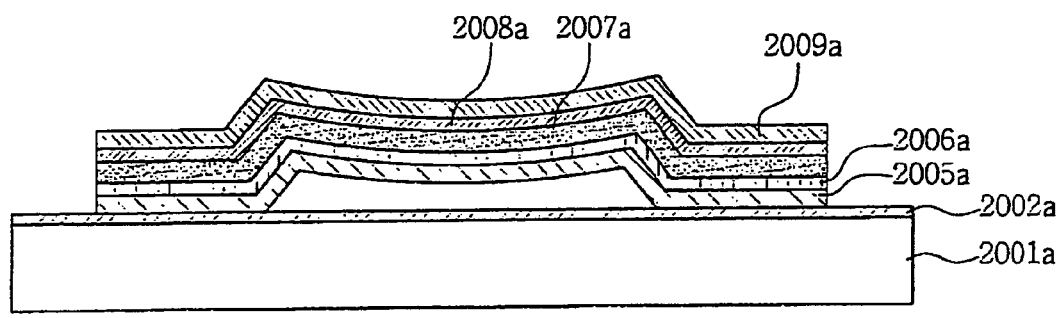
FIGS. 16a to 16c illustrate various diffractive thin-film piezoelectric micromirrors having raised parts, in which piezoelectric materials are deformed.
Figure 16B:
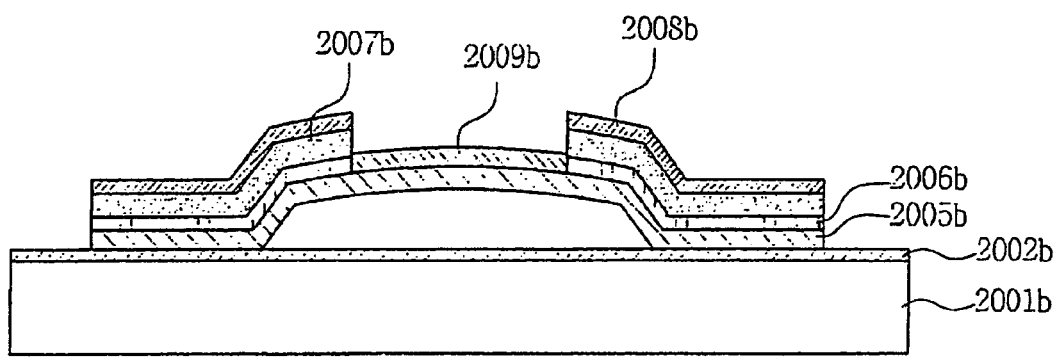
Figure 16C:
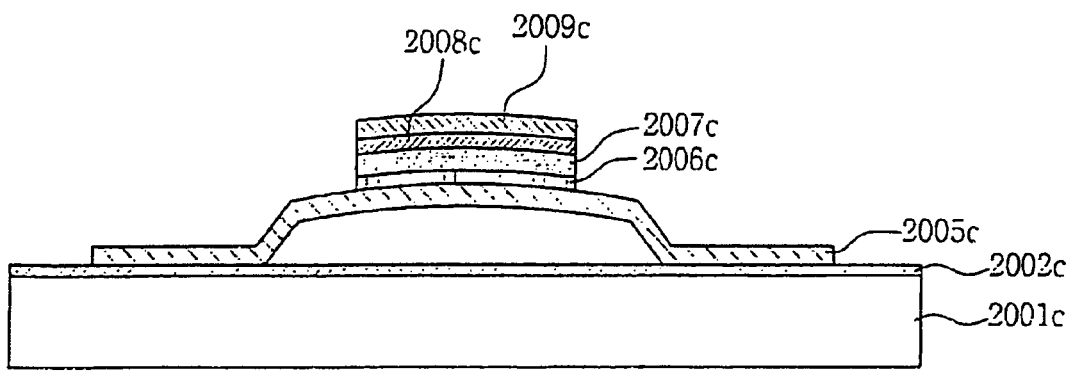

FIGS. 16a to 16c illustrate various diffractive thin-film piezoelectric micromirrors having raised parts, in which piezoelectric materials are deformed.

FIG. 16a shows that when voltage is applied to upper and lower sides of a piezoelectric material 2007a, a lower supporter 2005a, a lower electrode 2006a, a piezoelectric material layer 2007a, an upper electrode 2008a, and a micromirror 2009a are warped downward by contractile and expansive forces of the piezoelectric material. At this time, the contractile force acts on the piezoelectric material 2007a in a horizontal direction, endeavoring the piezoelectric material 2007a to shrink in a horizontal direction. However, since a lower side of the piezoelectric material 2007a is firmly attached to the lower supporter 2005a, the contractile force causes the piezoelectric material 2007a to be warped downward.

FIG. 16b shows that when voltage is applied to upper and lower sides of a piezoelectric material layer 2007b positioned on both ends of a lower supporter 2005b, a contractile force is generated in a horizontal direction. At this time, the contractile force acts on the piezoelectric material 2007b in the horizontal direction, causing the piezoelectric material 2007*b* to shrink in the horizontal direction. However, since a lower side of the piezoelectric material 2007*b* is firmly attached to the lower supporter 2005*b*, the contractile force enables the piezoelectric material 2007*b* to be warped upward. As a result, the lower supporter 2005*b* and a micromirror 2009*b* positioned on the center of the lower supporter 2005*b* are warped upward.

FIG. 16*c* shows that when voltage is applied to upper and lower parts of a piezoelectric material 2007*c* positioned on the center of a lower supporter 2005*c*, a lower electrode 2006*c*, a piezoelectric material layer 2007*c*, an upper electrode 2008*c*, and a micromirror 2009*c* are warped upward.

Figure 17A:
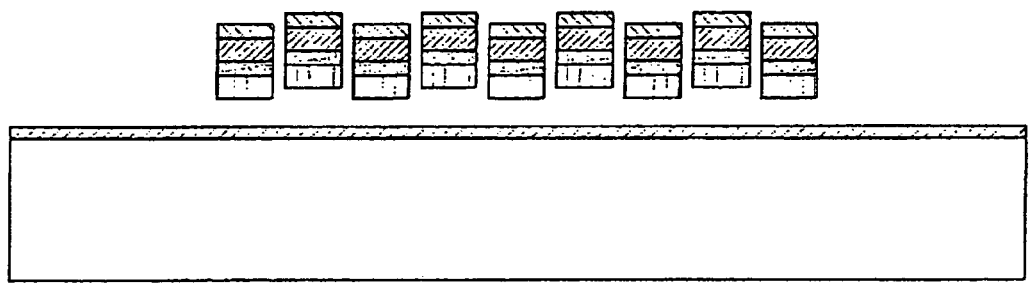
FIGS. 17a to 17b illustrate operation of a display element in which diffractive thin-film piezoelectric micromirrors having raised parts and the same or different widths are alternately arranged, and FIG. 17c illustrate operation of a display element in which diffractive thin-film piezoelectric micromirrors having raised parts are arranged at regular intervals.

FIG. 17*a* illustrates operation of a display element in which diffractive thin-film piezoelectric micromirrors having raised parts and the same width are arranged. The diffractive thin-film piezoelectric micromirrors are vertically moved by the application of voltage.

Figure 17B:
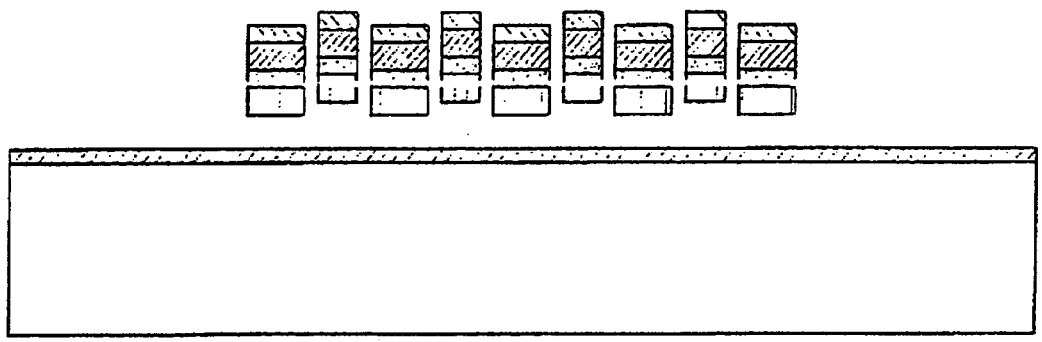

FIG. 17*b* illustrates operation of a display element in which diffractive thin-film piezoelectric micromirrors having raised parts and different widths are alternately arranged. The diffractive thin-film piezoelectric micromirrors are vertically moved by the application of voltage.

Figure 17C:
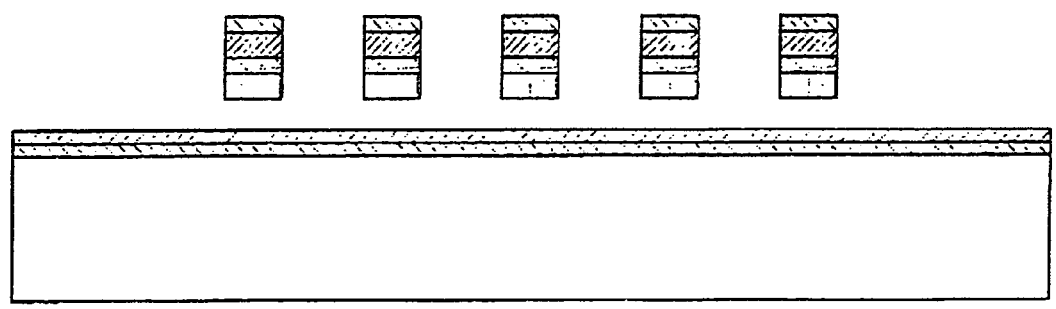

FIG. 17*c* illustrates operation of a display element in which diffractive thin-film piezoelectric micromirrors having raised parts are arranged at regular intervals. The micromirrors are formed on an upper side of an insulating layer to diffract incident light.

Meanwhile, the specification of the present invention describes only a piezoelectric material layer consisting of a single layer, but the piezoelectric material layer may comprise multiple layers so as to realize low voltage operation. At this time, the lower and upper electrodes consist of multiple layers.

In other words, it is possible to construct in such a manner that a first lower electrode, a first piezoelectric material layer, a first upper electrode, a second lower electrode, a second piezoelectric material layer, a second upper electrode, a third lower electrode . . . are sequentially laminated upward.

As described above, use of a piezoelectric sensor makes a correlation between voltage and displacement linear, whereas the correlation is nonlinear in the case of an electrostatic method according to a conventional technology.

Compared to the electrostatic method, the present invention is advantageous in that it is possible to gain the desired displacement at a relatively low voltage and to gain a high operation speed.

Another advantage of the present invention is that since it is possible to reliably control displacement of a ribbon, it is possible to achieve a gray scale control unlike the electrostatic method.

Furthermore, in the present invention, in the course of producing a piezoelectric micromirror array, it is possible to design various lengths and widths of ribbons, and thus, it is easy to tune light efficiency so as to satisfy requirements of relevant applications.

The diffractive thin-film piezoelectric micromirror and the production of the same according to the present invention have been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A light modulator comprising a diffractive piezoelectric mirror, which in turn comprises:
    (a) a substrate;
    (b) an elongate piezoelectric mirror layer which is attached directly to the substrate at both ends thereof and supported by the substrate at a location relative to the substrate to define a space between the substrate and the piezoelectric mirror layer, said elongate piezoelectric mirror layer comprising a piezoelectric material layer movable relative to the substrate when voltage is applied to opposite sides of the piezoelectric material layer, thereby reflecting incident light and diffracting incident light; and
    (c) said piezoelectric mirror layer comprises:
        (i) a first electrode layer positioned on the substrate so at least a portion of the first electrode layer is spaced from the substrate;
        (ii) a plurality of piezoelectric material layers which are disposed in multiple layers on the first electrode layer in which, when a voltage is applied to the material layers, the voltage-applied layers shrink and expand so as to generate an actuating force;
        (iii) a plurality of second electrode layers which are disposed between the piezoelectric material layers to provide the piezoelectric voltage to the piezoelectric material layers; and
        (iv) an electrode and mirror layer which is disposed on the layer of the piezoelectric material layers farthest from the first electrode layer, said electrode and mirror layer providing the piezoelectric voltage to the piezoelectric material layers to shift the electrode and mirror layer relative to the substrate to diffract the incident light.

2. The light modulator as set forth in claim 1, further comprising:
    an insulating layer formed on the substrate; and
    a support structure carried by the substrate, the support structure being configured so that a portion thereof is spaced from the substrate; and
    the piezoelectric mirror layer, mounted on the support structure, said piezoelectric mirror layer and expanding so as to generate an actuating force when a voltage is applied thereto, thereby moving the portion of the support structure that is spaced from the substrate a predetermined distance towards or away from the substrate thereby, diffracting light incident on the piezoelectric mirror layer.

3. The light modulator according to claim 1, wherein piezoelectric mirror layer flexes under the influence of the voltage applied to opposite sides thereof.

4. The light modulator according to claim 1, wherein the piezoelectric mirror layer is flexible in a direction lateral to its length.

5. The light modulator according to claim 1, wherein the piezoelectric mirror layer moves toward and away from the substrate to vary the proportion of reflected versus diffracted light.

6. The light modulator according to claim 1, further comprising a support layer interposed between the substrate and the piezoelectric mirror layer, said piezoelectric mirror layer being disposed on the support layer, at least a portion of the support layer configured to be spaced from the substrate so as to be movable relative to the substrate during actuation of the piezoelectric mirror layer.

7. A diffractive light modulator comprising a diffractive piezoelectric micromirror, which in turn comprises:

(a) a substrate;

(b) an elongate piezoelectric mirror layer which is attached directly to the substrate at both ends thereof and supported by the substrate at a location relative to the substrate to define a space between the substrate and the piezoelectric mirror layer, said elongate piezoelectric mirror layer comprising a piezoelectric material layer movable relative to the substrate when voltage is applied to opposite sides of the piezoelectric material layer, thereby reflecting incident light and diffracting incident light;

(c) wherein the substrate having portions defining a recess;

(d) further comprising a support structure carried by the substrate to span the recess;

(e) wherein the piezoelectric mirror layer is disposed on the structure, said piezoelectric mirror layer movable when voltage is applied to opposite sides of the piezoelectric mirror layer, and thus diffracts an incident light; and (f) wherein the piezoelectric mirror layer comprises:

(i) a first electrode layer which is disposed on the support structure to provide a piezoelectric voltage;

(ii) a plurality of piezoelectric material layers which are disposed in multiple layers on the first electrode layer in which, when a voltage is applied to the material layers, the voltage-applied layers shrink and expand so as to generate an actuating force toward or away from the substrate;

(iii) a plurality of second electrode layers which are disposed between the piezoelectric material layers to provide the piezoelectric voltage to the piezoelectric material layers; and (iv) an electrode and mirror layer which is disposed on the layer of the plurality of piezoelectric material layers farthest from the first electrode layer to provide the piezoelectric voltage to the piezoelectric material layers to shift the electrode and mirror layer relative to the substrate and to diffract the incident light.

8. The diffractive light modulator according to claim 7, wherein the piezoelectric mirror layer flexes under the influence of the voltage applied to opposite sides thereof.

9. The diffractive light modulator according to claim 7, wherein the piezoelectric mirror layer is flexible in a direction lateral to its length.

10. The diffractive light modulator according to claim 7, wherein the piezoelectric mirror layer moves toward and away from the substrate to vary the proportion of reflected versus diffracted light.

11. A diffractive light modulator comprising a diffractive piezoelectric micromirror, which in turn comprises:

(a) a substrate;

(b) an elongate piezoelectric mirror layer which is attached directly to the substrate at both ends thereof and supported by the substrate at a location relative to the substrate to define a space between the substrate and the piezoelectric mirror layer, said elongate piezoelectric mirror layer comprising a piezoelectric material layer movable relative to the substrate when voltage is applied to opposite sides of the piezoelectric material layer, thereby reflecting incident light and diffracting incident light;

(c) an insulating layer formed on the substrate;

(d) a support structure carried by the substrate, the support structure being configured so that a portion thereof is spaced from the substrate;

(e) wherein the piezoelectric mirror layer, mounted on the support structure, said piezoelectric mirror layer and expanding so as to generate an actuating force when a voltage is applied thereto, thereby moving the portion of the support structure that is spaced from the substrate a predetermined distance towards or away from the substrate, thereby diffracting light incident on the piezoelectric mirror layer; and (f) wherein the piezoelectric mirror layer comprises:

(i) a first electrode layer which is disposed on the support structure to provide a piezoelectric voltage;

(ii) a plurality of piezoelectric material layers which are disposed in multiple layers on the first electrode layer in which, when voltage is applied to the material layers, the voltage-applied layers shrink and expand so as to generate an actuating force;

(iii) a plurality of second electrode layers which are disposed between the piezoelectric material layers to provide the piezoelectric voltage to the piezoelectric material layers; and (iv) an electrode and mirror layer disposed on a layer of the piezoelectric material layers farthest from the first electrode layer to face away from the support structure to provide the piezoelectric voltage to the piezoelectric material layers, and to diffract the light incident on the electrode and mirror layer.

12. The diffractive light modulator according to claim 11, wherein the piezoelectric mirror layer flexes under the influence of the voltage applied to opposite sides thereof.

13. The diffractive light modulator according to claim 11, wherein the piezoelectric mirror layer is flexible in a direction lateral to its length.

14. The diffractive light modulator according to claim 11, wherein the piezoelectric mirror layer moves toward and away from the substrate to vary the proportion of reflected versus diffracted light.

* * * * *

UNITED STATES PATENT AND TRADEMARK OFFICE
CERTIFICATE OF CORRECTION

PATENT NO.        : 7,626,745 B2
APPLICATION NO.   : 10/952556
DATED             : December 1, 2009
INVENTOR(S)       : S. K. Yun et al.

It is certified that error appears in the above-identified patent and that said Letters Patent is hereby corrected as shown below:

| COLUMN | LINE | ERROR |
|---|---|---|
| 14 (Claim 3, | 50 line 1) | "wherein piezoelectric" should read --wherein said piezoelectric-- |

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,626,745 B2 | Page 1 of 1 |
| APPLICATION NO. | : 10/952556 | |
| DATED | : December 1, 2009 | |
| INVENTOR(S) | : Yun et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Second Day of November, 2010

David J. Kappos
*Director of the United States Patent and Trademark Office*